United States Patent
Yan et al.

(10) Patent No.: US 12,554,366 B2
(45) Date of Patent: Feb. 17, 2026

(54) DISPLAY DEVICE, TOUCH DISPLAY PANEL, AND DRIVING METHOD THEREFOR

(71) Applicants: Chengdu BOE Optoelectronics Technology Co., Ltd., Sichuan (CN); BOE Technology Group Co., Ltd., Beijing (CN)

(72) Inventors: Jun Yan, Beijing (CN); Xiangdan Dong, Beijing (CN); Haijun Qiu, Beijing (CN); Ming Hu, Beijing (CN); Yulong Wei, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/289,991

(22) PCT Filed: Apr. 26, 2022

(86) PCT No.: PCT/CN2022/089309
§ 371 (c)(1),
(2) Date: Nov. 8, 2023

(87) PCT Pub. No.: WO2023/206077
PCT Pub. Date: Nov. 2, 2023

(65) Prior Publication Data
US 2024/0272753 A1    Aug. 15, 2024

(51) Int. Cl.
*G06F 3/041* (2006.01)
*G06F 3/044* (2006.01)
*H10K 59/40* (2023.01)

(52) U.S. Cl.
CPC .......... *G06F 3/0441* (2019.05); *G06F 3/0446* (2019.05); *H10K 59/40* (2023.02); *G06F 2203/04102* (2013.01)

(58) Field of Classification Search
None
See application file for complete search history.

(56) References Cited

U.S. PATENT DOCUMENTS

| 8,325,147 B2 | 12/2012 | Brand et al. |
| 9,811,231 B2 | 11/2017 | Hung et al. |

(Continued)

FOREIGN PATENT DOCUMENTS

| CN | 205247353 U | 5/2016 |
| CN | 106227387 A | 12/2016 |

(Continued)

OTHER PUBLICATIONS

Translation of WO-2020177122-A1 into English; Zhang. (Year: 2020).*

(Continued)

*Primary Examiner* — Brian M Butcher
(74) *Attorney, Agent, or Firm* — Arch & Lake LLP

(57) ABSTRACT

The touch display panel includes a display area and a peripheral area located outside the display area. Part of the peripheral area protrudes in a direction away from the display area to form a lead-out area. The lead-out area has a bonding part. The touch display panel includes a display substrate, a touch layer, and switching circuits. The touch layer is provided on a side of the display substrate, and includes at least two touch islands arranged in an array. There is a gap between two adjacent touch islands. Each touch island includes at least two touch electrodes. The touch electrodes include at least two sensing electrodes for outputting sensing signals. The switching circuits are at least partially provided in the peripheral area. A touch island is connected to the bonding part through a switching circuit.

18 Claims, 9 Drawing Sheets

(56) References Cited

U.S. PATENT DOCUMENTS

| | | | |
|---|---|---|---|
| 10,168,732 B2 | 1/2019 | Hung et al. | |
| 11,182,035 B2 | 11/2021 | Jiang | |
| 2015/0242022 A1 | 8/2015 | Hung et al. | |
| 2017/0255303 A1 | 9/2017 | Hung et al. | |
| 2018/0224965 A1* | 8/2018 | Church | G06F 3/0443 |
| 2020/0073512 A1 | 3/2020 | Jiang | |

FOREIGN PATENT DOCUMENTS

| | | | |
|---|---|---|---|
| CN | 107168585 A | 9/2017 | |
| CN | 206557510 U | 10/2017 | |
| CN | 107977112 A | 5/2018 | |
| CN | 110036361 A | 7/2019 | |
| CN | 111477666 A | 7/2020 | |
| CN | 112764590 A | 5/2021 | |
| CN | 112799529 A | 5/2021 | |
| CN | 112860110 A | 5/2021 | |
| CN | 113050814 A | 6/2021 | |
| WO | WO-2020177122 A1 * | 9/2020 | G06F 3/0412 |

OTHER PUBLICATIONS

The Extend International Search Report of Application No. PCT/CN2022/089309, Dated on Jan. 12, 2023,(45P).
Written Opinion of Tiie International Searching Authority No. PCT/CN2022/089309, Dated on Jan. 12, 2023,(4P).
International Search Report of PCT/CN2022/089309 dated Jan. 12, 2023 with English translation (4p).
First European Search Report of EP Application No. 22938933.3 dated Oct. 23, 2025, (19p).

* cited by examiner

| Item | data | | |
|---|---|---|---|
| size/inch | 8.1 | 14.2 | 17.3 |
| schematic view | Trace Channel | Trace Channel | Trace Channel |
| Channel length/mm | 131.4 | 200.1 | 263.9 |
| Trace length/mm | 229.7 | 370.1 | 460.7 |
| Cp-normal/pF | 349.5 | 653.1 | 781.8 |
| active pen SNR/normal | V active pen*Cf/Vnoise*349.5 | V active pen*Cf/Vnoise*653.1 | V active pen*Cf/Vnoise*781.8 |
| Cp-partition detection/pF | 174.75 | 326.55 | 390.9 |
| active pen SNR-partition detection | >two times of active pen SNR-normal | | |

DISPLAY DEVICE, TOUCH DISPLAY PANEL, AND DRIVING METHOD THEREFOR

CROSS REFERENCE TO RELATED APPLICATION(S)

The present disclosure is a 35 U.S.C. 371 national phase application of PCT International Application No. PCT/CN2022/089309 filed on Apr. 26, 2022, the entire content of which is incorporated herein by reference in its entirety.

TECHNICAL FIELD

The present disclosure relates to the field of touch technology, and specifically, relates to a display device, a touch display panel, and a driving method for a touch display panel.

BACKGROUND

Touch display panels are essential parts of electronic devices, such as mobile phones and tablet computers, which display images and realize human-computer interactions through the touch display panels. Capacitive touch display panels are widely used, where touch operations can be achieved through contact by fingers or devices such as passive pens, or touch operations can be performed through active pens. However, the touch accuracy of existing capacitive touch display panels still needs to be improved.

It should be noted that the information disclosed in the above background section is only used to enhance understanding of the background of the present disclosure, and therefore may include information that does not constitute prior art known to those of ordinary skills in the art.

SUMMARY

The present disclosure provides a display device, a touch display panel, and a driving method for a touch display panel.

According to an aspect of the present disclosure, a touch display panel is provided. The touch display panel includes a display area and a peripheral area located outside the display area. Part of the peripheral area protrudes in a direction away from the display area to form at least one lead-out area. The lead-out area has a bonding part. The touch display panel includes:

a display substrate;
a touch layer, provided on a side of the display substrate and including at least two touch islands arranged in an array, where there is a gap between two adjacent touch islands, each touch island includes at least two touch electrodes, and the touch electrodes include at least two sensing electrodes for outputting sensing signals; and
switching circuits, at least partially provided in the peripheral area, where one of the touch islands is connected to the bonding part through one of the switching circuits, and the switching circuits are at least used to switch on or off the sensing electrodes and the bonding part.

In an exemplary embodiment of the present disclosure, the switching circuit includes at least two touch leads and switching elements, where any of the touch electrodes is connected to the bonding part through one of the touch leads.

The touch lead connected to the sensing electrode is provided with the switching element, and the switching element is used to switch on or off the touch lead connected to the switching element in response to a control signal.

In an exemplary embodiment of the present disclosure, the switching element is a switching transistor, a first terminal and a second terminal of the switching transistor are connected to one of the touch leads, and a gate of the switching transistor is used to receive the control signal.

In an exemplary embodiment of the present disclosure, the switching circuit further includes a switching scan line. In one of the switching circuits, the switching scan line is connected in series with the gate of each switching transistor, and is further connected to the bonding part, for transmitting the control signal.

In an exemplary embodiment of the present disclosure, the touch display panel includes:

a switching active layer, provided in the display substrate, and including a channel region and the first and second terminals on both sides of the channel region;
a first insulation layer covering the active layer;
a switching gate, provided on a surface of the first insulation layer away from the switching active layer and overlapping with the switching active layer to form the switching transistor, the switching gate being connected to the switching scan line; and
a second insulation layer covering the switching gate.

The touch lead is located on a side of the second insulation layer away from the switching active layer, and includes two lead segments arranged at intervals along the column direction. One of the lead segments is connected to the touch electrode and the first terminal, and the other of the lead segments is connected to the second terminal and the bonding part.

In an exemplary embodiment of the present disclosure, the switching active layer extends along the row direction, the first terminal and the second terminal are arranged on both sides of the channel region along the column direction, and the second terminal is located between the channel region and the bonding part.

The switching scan line and the switching gate form an integral structure, extend along the row direction, and overlap with the channel region of the switching active layer.

In an exemplary embodiment of the present disclosure, the touch display panel further includes:

a first conductive layer, provided on a surface of the second insulation layer away from the switching active layer, and including a first conductive part and a second conductive part arranged at intervals along the column direction, where the first conductive part overlaps and is connected through a first contact hole with the first terminal, and the second conductive part overlaps and is connected through a second contact hole with the second terminal;
a third insulation layer covering the first conductive layer;
a second conductive layer, provided on a surface of the third insulation layer away from the switching active layer, and including a third conductive part and a fourth conductive part arranged at intervals along the column direction, where the third conductive part overlaps and is connected with the first conductive part, and the fourth conductive part overlaps and is connected with the second conductive part; and
a fourth insulation layer covering the second conductive layer.

The touch lead is located on a side of the fourth insulation layer away from the switching active layer. The lead segment connecting the touch electrode is connected with the third conductive part, and the lead segment connecting the bonding part is connected with the fourth conductive part.

In an exemplary embodiment of the present disclosure, the first conductive part includes a first connection part and a second connection part connected along the column direction. The first connection part extends along the row direction. The first connection part overlaps and is connected through the first contact hole with the first terminal. The second connection part is connected to a side of the first connection part away from the second conductive part, and extends along the column direction. The second connection part is connected to the third conductive part.

The second conductive part includes a third connection part and a fourth connection part connected along the column direction. The third connection part extends along the row direction. The third connection part overlaps and is connected through the second contact hole with the second terminal. The fourth connection part is connected to a side of the third connection part away from the first conductive part, and extends along the column direction. The fourth connection part is connected to the fourth conductive part.

In an exemplary embodiment of the present disclosure, the first connection part is connected to the first terminal through at least two first contact holes arranged at intervals along the row direction. The second connection part is connected with the second terminal through at least two second contact holes arranged at intervals along the row direction.

In an exemplary embodiment of the present disclosure, the length of the switching active layer in the row direction is greater than the widths of the touch lead, the second connection part, the fourth connection part, the third conductive part, and the fourth conductive part in the row direction.

In an exemplary embodiment of the present disclosure, the switching active layer includes at least two active portions arranged at intervals along the row direction. Each of the active portions overlaps with the switching scan line, and is connected to the first conductive part and the second conductive part.

In an exemplary embodiment of the present disclosure, the display substrate includes a driving backplane, a light-emitting layer, and an encapsulation layer that are stacked in sequence. The touch layer is located on a side of the encapsulation layer away from the driving backplane.

The driving backplane includes:
a substrate;
a semiconductor layer, provided on a side of the substrate, the switching active layer being located on the semiconductor layer;
a first gate insulation layer covering the semiconductor layer, the first insulation layer being located on the gate insulation layer;
a first gate layer, provided on the surface of the gate insulation layer away from the substrate, the switching gate being located on the first gate layer;
a second gate insulation layer covering the first gate layer;
a second gate layer, provided on the surface of the second gate insulation layer away from the substrate;
an interlayer dielectric layer covering the second gate layer, where the second insulation layer includes part of the gate insulation layer and part of the interlayer dielectric layer;
a first source and drain layer, provided on the surface of the interlayer dielectric layer away from the substrate, where the first conductive layer is located on the first source and drain layer;
a first planarization layer covering the first source and drain layer, the third insulation layer being located on the first planarization layer;
a second source and drain layer, provided on the surface of the first planarization layer away from the substrate, the second conductive layer being located on the second source and drain layer;
a second planarization layer covering the second source and drain layer, where the light-emitting layer is provided on the surface of the second planarization layer away from the substrate, and both the light-emitting layer and the encapsulation layer expose the lead-out area; and
a touch buffer layer covering the area where the light-emitting layer and the second planarization layer are located in the lead-out area.

The touch layer is provided on the surface of the touch buffer layer away from the substrate. The fourth insulation layer includes part of the second planarization layer and part of the touch buffer layer.

In an exemplary embodiment of the present disclosure, the bonding part includes at least two pads. One of the touch leads is connected to one of the pads, and the switching scan line is connected to one of the pads.

In an exemplary embodiment of the present disclosure, in one of the touch islands, the touch electrodes include at least two first touch electrodes and at least two second touch electrodes. The first touch electrodes extend in the column direction and are arranged at intervals along the row direction. The second touch electrodes extend along the row direction and are arranged at intervals along the column direction. Any of the first touch electrodes intersects with, but is insulated from, each of the second touch electrodes.

The first touch electrode is a driving electrode for receiving a driving signal, and the second touch electrode is the sensing electrode.

In an exemplary embodiment of the present disclosure, each of the touch electrodes is the sensing electrode.

In an exemplary embodiment of the present disclosure, one of the first touch electrodes includes at least two first electrode blocks arranged at intervals along a column direction and transfer bridges connecting two adjacent first electrode blocks. One of the second touch electrodes includes at least two second electrode blocks connected in series along the row direction. One of the transfer bridges intersects with one of the second touch electrodes.

The touch layer includes: a transfer layer, provided on a side of the display substrate and including the transfer bridges; an isolation layer covering the transfer layer; and an electrode layer, provided on a surface of the isolation layer away from the display substrate, and including the first electrode block and the second electrode block.

In an exemplary embodiment of the present disclosure, the gap is located in the electrode layer and cuts off part of the first electrode block and part of the second electrode block.

In an exemplary embodiment of the present disclosure, the gap includes at least one first gap and at least one second gap. The first gap extends along the column direction. The second gap extends along the row direction and intersects with the first gap.

In an exemplary embodiment of the present disclosure, the gap extends along a curved or polyline trajectory.

According to an aspect of the present disclosure, a driving method for a touch display panel is provided. The touch display panel is the touch display panel described in any of the above embodiments. The touch islands include a plurality of groups of the touch islands, and each group of the touch islands comprises one or more of the touch islands.

The driving method includes: within a touch cycle, sequentially switching on the switching circuits of the bonding part and each group of the touch islands, and sequentially acquiring the sensing signal generated by each group of the touch islands; and determining the touch position according to the sensing signal.

According to an aspect of the present disclosure, a display device is provided, including: the touch display panel described in any of the above embodiments; a flexible circuit board connected to the bonding part; and a touch chip connected to the flexible circuit board.

It should be understood that the foregoing general description and the following detailed description are exemplary and explanatory only, and do not limit the present disclosure.

BRIEF DESCRIPTION OF THE DRAWINGS

The accompanying drawings, which are incorporated in and constitute a part of this specification, illustrate embodiments consistent with the present disclosure and together with the description, serve to explain the principles of the present disclosure. It is noted that the drawings in the following description are only some embodiments of the present disclosure. For those of ordinary skills in the art, other drawings can be obtained based on these drawings without exerting creative efforts.

DETAILED DESCRIPTION OF THE EMBODIMENTS

Figure 1:
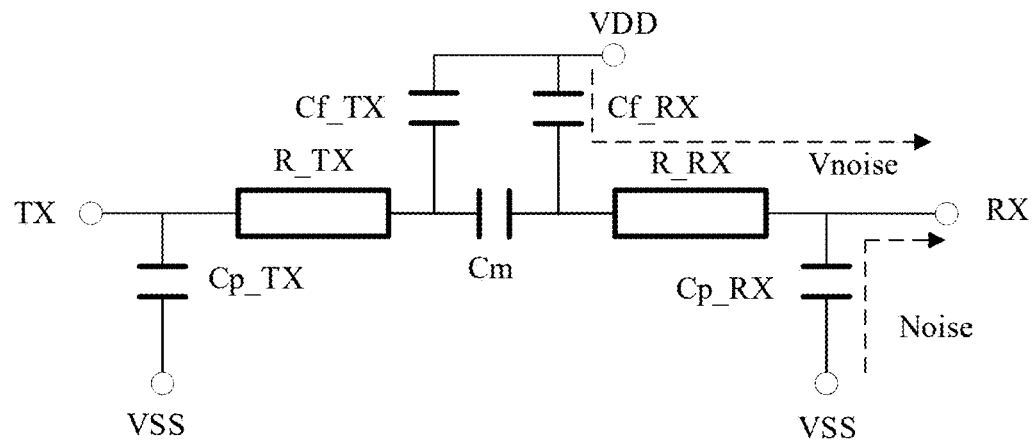
FIG. 1 is a circuit schematic diagram of a touch display panel in related art.

Example embodiments will now be described more fully with reference to the accompanying drawings. Example embodiments may, however, be embodied in various forms and should not be construed as limited to the embodiments set forth herein. Rather, these embodiments are provided so that the present disclosure will be thorough and complete and will fully convey the concepts of the example embodiments to those skilled in the art. The same reference numerals in the drawings indicate the same or similar structures, and thus their detailed descriptions will be omitted. Furthermore, the drawings are merely schematic illustrations of the present disclosure and are not necessarily drawn to scale.

The terms "a", "an", "the", "said", and "at least one" are used to indicate the presence of one or more elements/components/etc. The terms "include" and "have" are used to indicate an open-ended inclusion, and mean that there may be additional elements/components/etc. in addition to those as listed. The terms "first", "second", "third" etc. are only used as markers, not to limit the number of the associated objects.

The row direction X and the column direction Y in the present application are only two mutually perpendicular directions. In the drawings of the present disclosure, the row direction X may be transverse, and the column direction Y may be vertical, but the present disclosure is not limited only thereto. When the touch display panel is rotated, the actual orientations of the row direction X and the column direction Y may change. In the drawings, the X direction exemplifies the row direction, and the Y direction exemplifies the column direction.

In the related art, a touch display panel generally includes a display substrate and a touch layer located on the light exit side of the display substrate. The display substrate is used to display images. The touch layer is used to determine the touch position based on the sensing signal, so as to generate the specific image on the display substrate to enable human-computer interactions. For a capacitive touch display panel, the touch layer includes a plurality of touch electrodes. The touch electrodes detect capacitance changes caused by operations of fingers or stylus pens to obtain sensing signals, thereby determining the touch position.

The present inventor(s) found that because of the presence of a conductive film layer in the display substrate, and the signal change of the conductive film layer, a coupling signal that interferes with the sensing signal of the touch electrode is generated. This reduces the signal-to-noise ratio of the detected signal and affects the accuracy of touch. Especially, for products that use active pens for touch, since the amount of signals coupled between the active pens and the touch electrodes is small, and the amount of signals in the suspended state (where the active pens are not in contact with the touch display panel) is even smaller, the coupling signal generated by the conductive film layer may be greater than the coupling signal between the touch electrode and the active pens, which greatly reduces the accuracy of touch or even renders it to fail.

For example, a mutual capacitive touch display panel that uses organic electroluminescent diodes (OLEDs) as light-emitting devices is taken as an example, where the display substrate may include a driving backplane, a light-emitting layer, and an encapsulation layer. The light-emitting layer is provided on a side of the driving backplane, and includes a plurality of light-emitting devices. The light-emitting device may include a first electrode, a light-emitting material layer, and a second electrode that are sequentially stacked in a direction away from the driving backplane. The first electrode arrays are arranged in an array, and the second electrode may be an entire layer structure, which allows each light-emitting device to share the second electrode. The encapsulation layer covers the light-emitting device.

The touch layer may be located on the side of the encapsulation layer away from the driving backplane, and includes driving electrodes and sensing electrodes that are insulated from each other. Capacitances are generated between the driving electrodes and the sensing electrodes. The driving signal may be input to the driving electrode, and the sensing signal may be acquired through the sensing electrode. Since passive objects such as fingers or passive pens may generate coupling signals with the driving electrodes and the sensing electrodes and the coupling signals affect the sensing signals, when the fingers and the passive pens perform touch operations, the changed driving electrodes and sensing signals can be determined by detecting changes in the sensing signals, thereby determining the touch position. If an active pen is used for touch, the active pen itself may generate coupling signals with the driving electrodes and the sensing electrodes through the signals it generates, so that both the driving electrodes and the sensing electrodes can receive the sensing signals for determining the touch position.

However, the jump of the power signal of the second electrode will cause greater noise in the sensing signal of the touch layer, thereby reducing the signal-to-noise ratio of the sensing signal, and affecting the accuracy of touch. The larger the size of the touch display panel, the longer the sensing electrode and the driving electrode, the larger the area of the second electrode and the touch layer, the larger the resistive capacitive load (RC Loading), and the greater the noise as generated. Therefore, the larger the size of the touch display panel, the more difficult it is to improve the accuracy of touch.

Referring to FIG. 1, it shows the underlying principle of the above technical problem, where TX is the driving electrode, RX is the sensing electrode, Cm is the capacitance between the driving electrode TX and the sensing electrode RX, R_TX is the resistance of the driving electrode TX, R_RX is the resistance of the sensing electrode RX, VDD is the power signal of the active pen, Cf_TX is the capacitance between the active pen and the driving electrode TX, Cf RX is the capacitance between the active pen and the sensing electrode RX, Cp_TX is the capacitance generated between the second electrode and the driving electrode TX, Cp_RX is the capacitance generated between the second electrode and the sensing electrode RX, and Cp_RX and Cp_TX are both coupling signals (capacitances) generated by the power signal VSS of the second electrode, which are coupled as noise to the received signal of the sensing electrode RX, thereby obtaining the sensing signal Vnoise coupled with the noise.

In view of the above related technologies, the present inventor(s) provides a touch display panel, as shown in FIGS. 2 and 5-7. The touch display panel may include a display area AA and a peripheral area WA located outside the display area AA. Part of the peripheral area WA protrudes in a direction away from the display area AA and forms at least one lead-out area FA. The lead-out area FA has a bonding part BON. The touch display panel of the present disclosure may include a display substrate PNL, a touch layer TL, and switching circuits SCs.

The touch layer TL is provided on one side of the display substrate PNL, and includes at least two touch islands TSIs arranged in an array. There is a gap Path between two adjacent touch islands TSIs. Each touch island TSI includes at least two touch electrodes. The touch electrodes may include at least two sensing electrodes for outputting sensing signals.

The switching circuit SC is at least partially provided in the peripheral area WA. A touch island TSI is connected to the bonding part BON through a switching circuit SC. The switching circuit SC is at least used to switch on or off the sensing electrode and the bonding part BON.

The touch display panel according to an embodiment of the present disclosure splits the touch layer TL into at least two touch islands TSI arranged at intervals. That is, a large touch area is split into multiple independent small touch areas. Correspondingly, the area of the touch electrode is reduced, and its resistive and capacitive load is reduced, so that the coupling signal (noise) of the display panel to any touch island TSI is smaller than the coupling signal to the touch layer TL when it is not split. This increases the signal-to-noise ratio of each touch island TSI and improves the accuracy of touch. During a touch period, the sensing signal of each touch island TSI may be detected sequentially to determine the touch position. It is noted that the touch islands TSIs may also be divided into multiple groups, and each group may have at least one touch island TSI. The sensing signals of each group of touch islands TSIs may be detected in sequence and the touch position may also be determined.

The touch display panel of the present disclosure is described in detail below.

Figure 2:
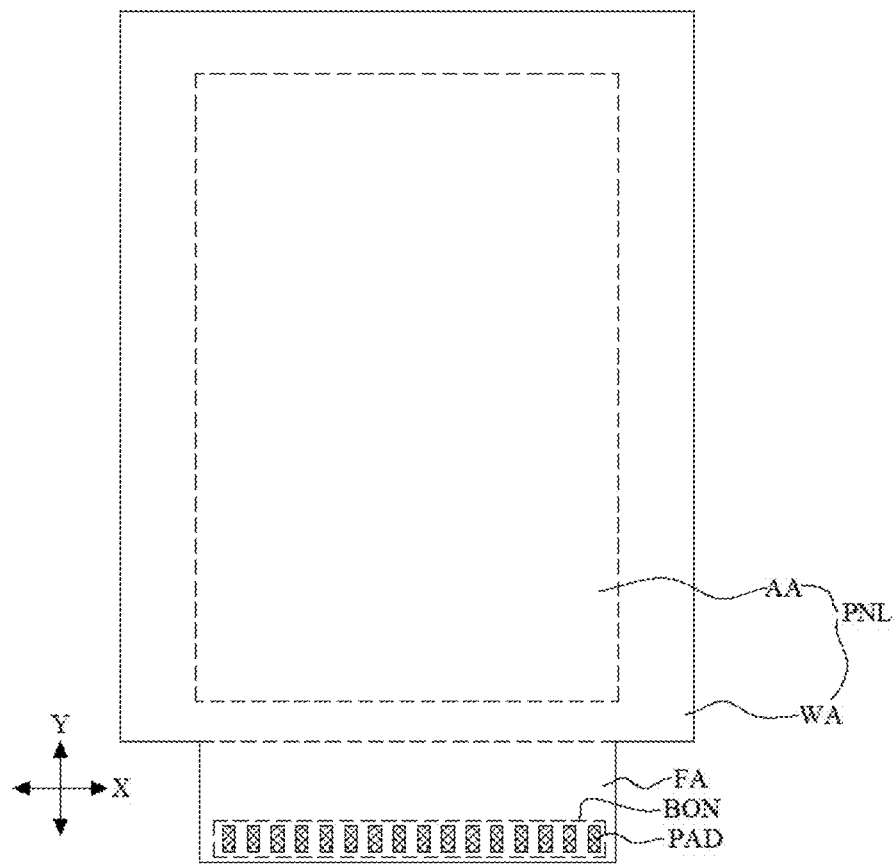
FIG. 2 is a top view of a touch display panel according to an embodiment of the present disclosure.

As shown in FIG. 2, the touch display panel of the present disclosure may be divided into a display area AA and a peripheral area WA. The peripheral area WA is located outside the display area AA, and may be an annular area surrounding the display area AA. At the same time, part of the peripheral area WA may extend in a direction away from the display area AA to form a lead-out area FA. A bonding part BON may be provided in the lead-out area FA. The bonding part BON may be bonded to the flexible circuit board. The flexible circuit board may be connected to a control circuit board, and the control circuit board may be used for driving the touch display panel. At the same time, the flexible circuit board or the control circuit board may be equipped with a touch chip for receiving sensing signals to determine the touch position and display a designated image based on the touch position.

The following is a detailed description of the touch display panel.

The touch display panel may include a display part and a touch part. The display part is a display substrate PNL. The touch part includes a touch layer TL. The touch layer TL is located on one side of the display substrate PNL.

First, the display substrate PNL is explained as follows.

The display substrate PNL of the present disclosure may be a display substrate PNL using an organic electroluminescent diode as a light-emitting device, or may be a liquid crystal display substrate PNL or other display substrate PNL. In the following, the display substrate PNL using an organic electroluminescent diode will be used as an example for illustration.

The display substrate PNL may include a driving backplane BP, a light-emitting layer OL, and an encapsulation layer TFE. The light-emitting layer OL includes a plurality of light-emitting devices. The driving backplane BP may drive the light-emitting devices to emit light. The encapsulation layer TFE covers the light-emitting layer OL.

The driving backplane BP has a driving circuit that can drive the light-emitting device to emit light for displaying images.

The driving backplane BP may include a substrate SU and a circuit layer located on one side of the substrate SU. The substrate SU may have a flat structure, and its material may be a hard material such as glass or a soft material such as polyimide.

The circuit layer may be provided on one side of the substrate SU, and includes a driving circuit through which the light-emitting device can be driven to emit light. For example, the driving circuit may include a pixel circuit located in the display area AA and a peripheral circuit located in the peripheral area WA. The pixel circuit may be a 3T1C, 6T1C, 7T1C, etc. pixel circuit, as long as it can drive the light-emitting device to emit light. There is no special limitation on the structure of the pixel circuit here. The number of pixel circuits may be the same as the number of light-emitting devices, and the pixel circuits are connected to the light-emitting devices in a one-to-one correspondence for controlling each light-emitting device to emit light. nTmC means that a pixel circuit includes n transistors (indicated by the letter "T") and m capacitors (indicated by the letter "C"). It is noted that the same pixel circuit may also be connected to multiple light-emitting devices and drive multiple light-emitting devices to emit light at the same time. There is no special limitation here.

The peripheral circuit is connected to the pixel circuit and is used to input electrical signals to the pixel circuit and the light-emitting layer OL in order to control the light-emitting device to emit light. For example, the light-emitting device may include a first electrode ANO, a light-emitting material layer EL, and a second electrode CAT. The peripheral circuit may input a first power signal to the pixel circuit, and input a second power signal (VSS in FIG. 1) to the second electrode of the light-emitting device. The peripheral circuit may include a gate driving circuit and a light-emitting control circuit. It is noted that other circuits may also be included. The specific structure of the peripheral circuit is not particularly limited here. The peripheral circuit may be connected to the flexible circuit board FPC through the bonding part BON.

Figure 4:
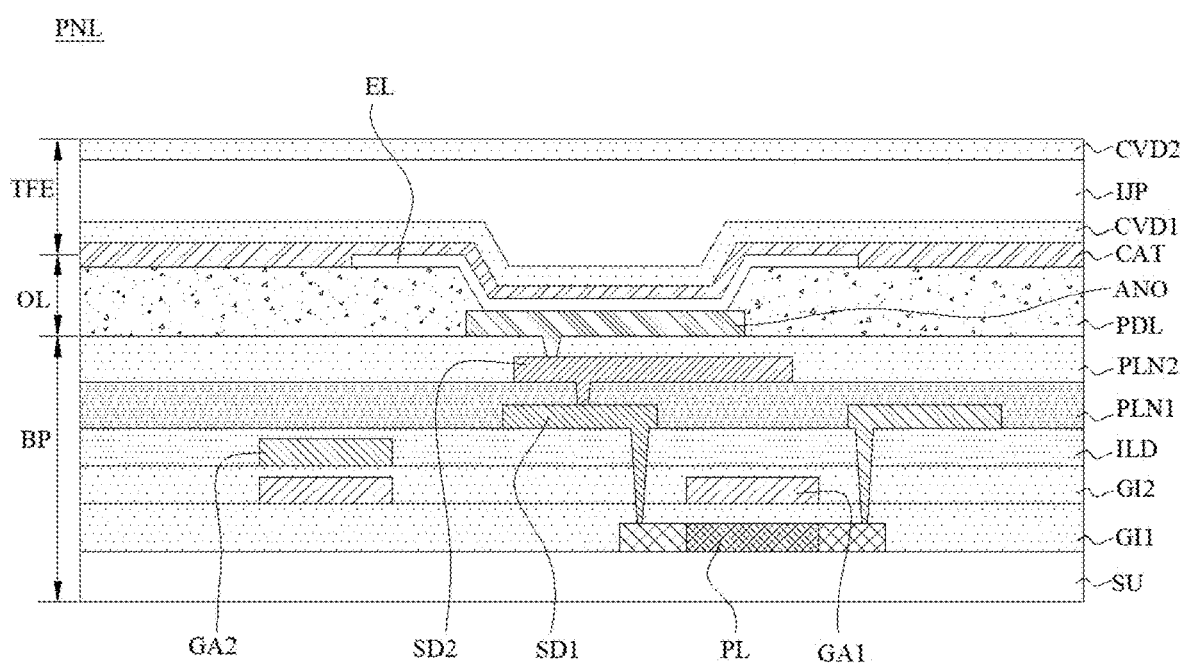
FIG. 4 is a cross-sectional view of the display substrate in the touch display panel according to an embodiment of the present disclosure.

The above circuit layer may include a plurality of thin film transistors and storage capacitors. The thin film transistors may be top gate or bottom gate thin film transistors, and each thin film transistor may include an active layer and a gate. With the top gate thin film transistor being an example, as shown in FIG. 4, the circuit layer may include a semiconductor layer PL, a first gate insulation layer GI1, a first gate layer GA1, a second gate insulation layer GI2, a second gate layer GA2, an interlayer dielectric layer ILD, a first source and drain layer SD1, a first planarization layer PLN1, a second source and drain layer SD2, and a second planarization layer PLN2. The semiconductor layer PL is provided on one side of the substrate SU, and there may be a buffer layer provided between the semiconductor layer PL and the substrate SU. The semiconductor layer PL may include active layers of respective thin film transistors. The first gate insulation layer GI1 covers the semiconductor layer PL. The first gate layer GA1 is provided on a surface of the gate insulation layer away from the substrate SU, and includes the gate of each thin film transistor and a plate of the storage capacitor. The second gate insulation layer GI2 covers the first gate layer GA1. The second gate layer GA2 is provided on the surface of the second gate insulation layer GI2 away from the substrate SU, and includes another plate of the storage capacitor. The interlayer dielectric layer ILD may cover the second gate layer GA2. The first source and drain layer SD1 is provided on the surface of the interlayer dielectric layer ILD away from the substrate SU. The first planarization layer PLN1 may cover the first source and drain layer SD1. The second source and drain layer SD2 is provided on the surface of the first planarization layer PLN1 away from the substrate SU, and may include a first power line. The second planarization layer PLN2 covers the second source and drain layer SD2. The specific pattern of each film layer depends on the specific structure of the driving circuit, and is not specifically limited here.

As shown in FIG. 4, the light-emitting layer OL is provided on one side of the driving backplane BP, and includes a light-emitting device and a pixel definition layer PDL used to define the range of the light-emitting device. For example, the pixel definition layer PDL and the light-emitting device may be provided on the surface of the second planarization layer PLN2 away from the substrate SU. The orthographic projection of each light-emitting device on the driving backplane BP may be located in the display area AA, and the light-emitting layer OL may expose at least part of the lead-out area FA. That is, at least part of the lead-out area FA may not have the light-emitting device and the pixel definition layer. Each light-emitting device may include a first electrode ANO, a second electrode CAT, and a light-emitting material layer EL between the first electrode ANO and the second electrode CAT. By applying an electrical signal to the first electrode ANO and the second electrode CAT (the first power signal and the second power signal), the light-emitting material layer EL may be excited to emit light. The light-emitting device may be an organic electroluminescent diode (OLED).

As shown in FIG. 4, the first electrodes ANOs of various light-emitting devices are arranged at intervals, and the first electrode ANO serves as the anode of the light-emitting device. The pixel definition layer PDL is provided with openings exposing each first electrode ANO. That is, one opening exposes one first electrode ANO. The pixel definition layer PDL may be used to define the range of each light-emitting device, and the range of one opening is the range of one light-emitting device. The shape of the opening, that is, the shape of the boundary of the orthographic projection of the opening on the driving backplane BP, may be a polygon such as a rectangle, a pentagon, a hexagon, etc., or may be an ellipse, a sector, or other shapes. The shape is not specially restricted here.

At least part of the light-emitting material layer EL is located in the opening and is stacked with the first electrode ANO. The light-emitting material layer EL may include a hole injection layer, a hole transport layer, a light-emitting material layer EL, an electron transport layer, and an electron injection layer sequentially stacked in a direction away from the driving backplane BP. It is noted that other structures may also be used, as long as they can emit light in conjunction with the first electrode ANO and the second electrode CAT.

The second electrode CAT may cover the light-emitting material layer EL, and the second electrode CAT may be a continuous whole-layer structure, so that each light-emitting device can share the same second electrode CAT. At the same time, the second electrode CAT may be the cathode of the light-emitting device, which may adopt a light-transmittive structure, so that the light-emitting device can emit light in a direction away from the driving backplane BP. For example, the material of the second electrode CAT may be metal magnesium, silver, or alloys thereof, etc. With a certain thickness, the second electrode CAT may conduct electricity while transmitting light. At the same time, the first electrode ANO may have an opaque structure, so that the light-emitting device has a top-emitting structure.

The second electrode CAT may extend into the peripheral area WA and be connected to a second power signal line to receive the second power signal. The second power signal line may be arranged on the same layer as the first electrode ANO. When displaying an image, the first power signal may be applied to the first electrode ANO through the control by the pixel circuit control, and the second power signal may be applied to the second electrode CAT through the second power signal line, thereby stimulating the light-emitting layer OL to emit light, and resulting in the organic electroluminescence. The specific principles will not be described in detail here.

In some embodiments of the present disclosure, as shown in FIG. 4, each light-emitting device may emit light independently, and the light-emitting colors of different light-emitting devices may be different. Specifically, the light-emitting material layer EL may include a plurality of light-emitting units arranged at intervals. Each light-emitting unit is provided in a respective opening in a one-to-one correspondence. Each light-emitting unit may emit light independently, and the light-emitting colors may be different, so that color display can be directly realized. Accordingly, the second electrode CAT not only covers the light-emitting material layer EL, but also covers the area of the pixel definition layer PDL that is not covered by the light-emitting material layer EL.

In some embodiments of the present disclosure, the light-emitting material layer EL may also cover the pixel definition layer PDL and each first electrode ANO at the same time. That is, each light-emitting device may share the same light-emitting material layer EL. In this case, the light-emitting color of each light-emitting device is the same. In order to achieve color display, a filter structure that only transmits monochromatic light may be set on the side of the light emitter away from the driving backplane BP. The colors of the filter structures corresponding to different light-emitting devices may be different, and each filter structure may form a color filter layer.

As shown in FIG. 4, the encapsulation layer TFE may cover the light-emitting layer OL to protect the light-emitting layer OL and prevent external water and oxygen from corroding the light-emitting device. For example, the encapsulation layer TFE may be in the form of thin film encapsulation, which may include a first inorganic layer CVD1, an organic layer IJP, and a second inorganic layer CVD2.

The first inorganic layer CVD1 may cover each light-emitting device. That is, the first inorganic layer CVD1 may cover the surface of the second electrode CAT away from the driving backplane BP. The material of the first inorganic layer CVD1 may include inorganic insulation materials such as silicon nitride and silicon oxide.

The organic layer IJP may be disposed on the surface of the first inorganic layer CVD1 away from the driving backplane BP, and the boundary of the organic layer IJP may be limited to be inside of the boundary of the first inorganic layer CVD1 by a barrier dam located in the peripheral area WA. The boundary of the orthographic projection of the organic layer IJP on the driving backplane BP may be located in the peripheral area WA to ensure that the organic layer IJP can cover each light-emitting device. The material of the organic layer IJP may be organic materials such as resin.

The second inorganic layer CVD2 may cover the organic layer IJP and the first inorganic layer CVD1 that is not covered by the organic layer IJP, and can block the intrusion of water and oxygen through the second inorganic layer CVD2. The planarization is achieved through the organic layer IJP with fluidity (during the manufacturing process). The material of the second inorganic layer CVD2 may include inorganic insulation materials such as silicon nitride and silicon oxide. It should be noted that the color filter layer mentioned in some embodiments above may be provided on the side of the encapsulation layer TFE away from the driving backplane BP.

The boundary of the encapsulation layer TFE may be located in the peripheral area WA, but the lead-out area FA may be exposed. That is, the encapsulation layer TFE may not exist in the lead-out area FA.

The touch layer TL of the present disclosure is described in detail below.

Figure 3:
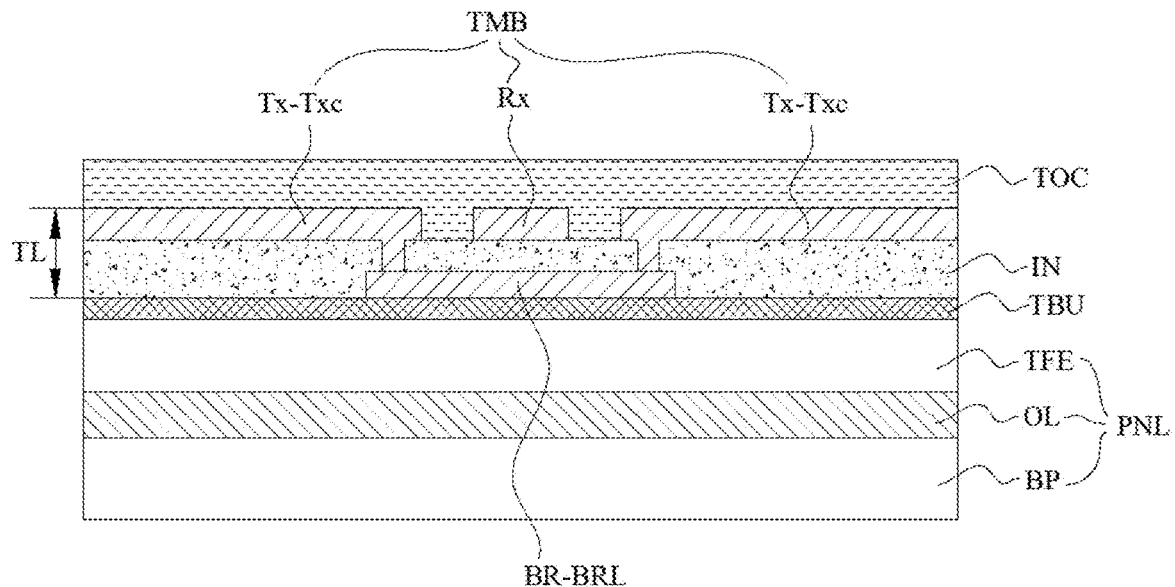
FIG. 3 is a cross-sectional view of a touch display panel according to an embodiment of the present disclosure.

As shown in FIG. 3, the touch layer TL may be provided on one side of the display substrate PNL, and may be directly provided on the surface of the encapsulation layer TFE away from the driving backplane BP. Alternatively, the touch buffer layer TBU may be provided on the surface of the encapsulation layer TFE away from the driving backplane BP. Touch layer TL is provided on the surface of the touch buffer layer TBU away from the driving backplane BP, and the touch buffer layer TBU may cover the area of the second planarization layer PLN2 located in the lead-out area FA. That is, in the second lead-out area FA, the touch buffer layer TBU and the second planarization layer PLN2 are stacked.

As shown in FIGS. 5 to 7 and 9, the touch layer TL may include at least two touch islands TSIs arranged in an array. There is a gap Path between two adjacent touch islands TSIs, so that each touch island TSI is independent of each other. Each touch island TSI includes at least two touch electrodes, and the touch electrodes may include at least two sensing electrodes for outputting sensing signals. The touch layer TL may adopt the principle of self-capacitance or mutual-capacitance. In the following, the mutual-capacitance touch structure is taken as an example.

As shown in FIGS. 3 and 5-7, in some embodiments of the present disclosure, in a touch island TSI, the touch electrodes may include at least two first touch electrodes TXs and at least two second touch electrodes RXs, any first touch electrode TX extends in the column direction Y, and the first touch electrodes TXs may be arranged at intervals along the row direction X. At the same time, any second touch electrode RX may extend along the row direction X, and the second touch electrodes RXs may be arranged at intervals along the column direction Y. Any first touch electrode TX intersects with, but is insulated from, each second touch electrode RX.

Further, in order to achieve the intersection and insulated arrangement of the first touch electrode TX and the second touch electrode RX, a first touch electrode TX may include at least two first electrode blocks TXcs arranged at intervals along the column direction Y and transfer bridges BRs connecting two adjacent first electrode blocks TXcs. Two adjacent first electrode blocks TXcs may be connected by a transfer bridge BR extending along the column direction Y, or may be connected by multiple transfer bridges BRs extending along the column direction Y and arranged along the row direction. A second touch electrode RX may include at least two second electrode blocks RXcs connected in series along the row direction X. A transfer bridge BR is intersected with a second touch electrode RX, so that the first touch electrode TX and the second touch electrode RX are intersected.

As shown in FIG. 3, for the above-mentioned first touch electrode TX and second touch electrode RX, the touch layer TL may include a transfer layer BRL, an isolation layer IN, and an electrode layer TMB.

The transfer layer BRL may be disposed on one side of the display substrate PNL. For example, the transfer layer BRL may be disposed on the surface of the touch buffer layer TBU away from the driving backplane BP. At the same time, each transfer bridge BR may be located at the transfer layer BRL. The material of the transfer layer BRL may be metal or other conductive materials.

The isolation layer IN may cover the transfer layer BRL, and the isolation layer IN may be made of insulation materials such as silicon nitride.

The electrode layer TMB may be disposed on the surface of the isolation layer IN away from the display substrate PNL, and includes the above-mentioned first electrode block TXc and second electrode block RXc. That is to say, the first electrode block TXc and the second electrode block RXc may be located on the same film layer, and thus may be manufactured and formed at the same time. The adjacent first electrode block TXc and second electrode block RXc are spaced apart and form a capacitor. It should be noted that the adjacent first electrode block TXc and second electrode block RXc refer to no other first electrode block TXc and no other second electrode block RXc being present between the first electrode block TXc and the second electrode block RXc.

Figure 10:
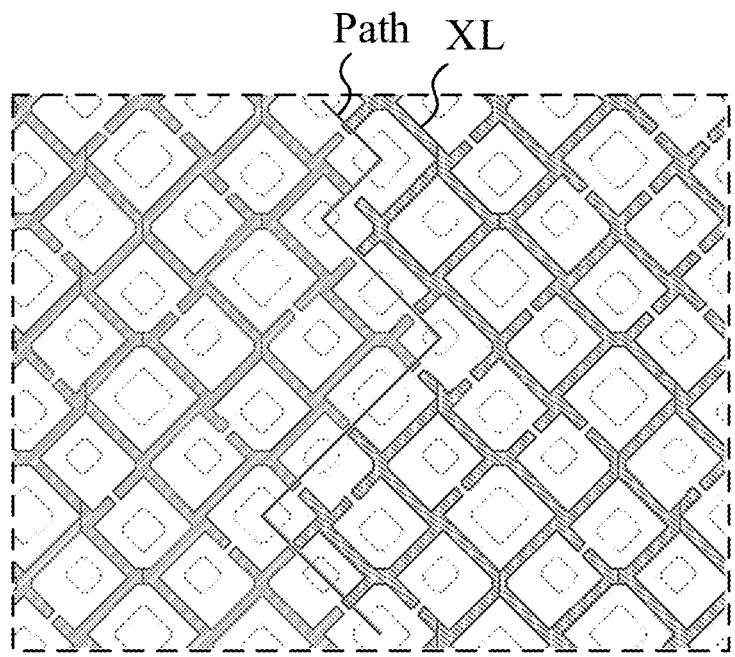
FIG. 10 is a partial enlarged view of the touch layer in the touch display panel according to an embodiment of the present disclosure.

As shown in FIG. 10, in order to reduce the obstruction of the light emitted by the display substrate PNL, both the first touch electrode TX and the second touch electrode RX may be a mesh structure formed by a plurality of channel lines XLs. That is, the first electrode block TXc, the second electrode block RXc, and the transfer bridge BR may both have a mesh structure. The mesh hole may be in a polygonal shape, such as a rhombus or a hexagon, and is not particularly limited here. The orthographic projection of the channel line XL on the driving backplane BP is located outside the orthographic projection of the light-emitting device on the driving backplane BP, so that the channel line XL does not block the light-emitting device, and the light emitted by the light-emitting device can emerge from the mesh hole.

For the case where passive objects such as fingers and passive pens perform the touch operation, the first touch electrode TX may be used as the driving electrode to receive the driving signal, the second touch electrode RX may be used as the sensing electrode, and the sensing signal may be received through the second touch electrode RX and finally transmitted to the touch chip. When an active object such as an active pen performs the touch operation, both the first touch electrode TX and the second touch electrode RX may be used as sensing electrodes to transmit sensing signals to the touch chip.

Figure 5:
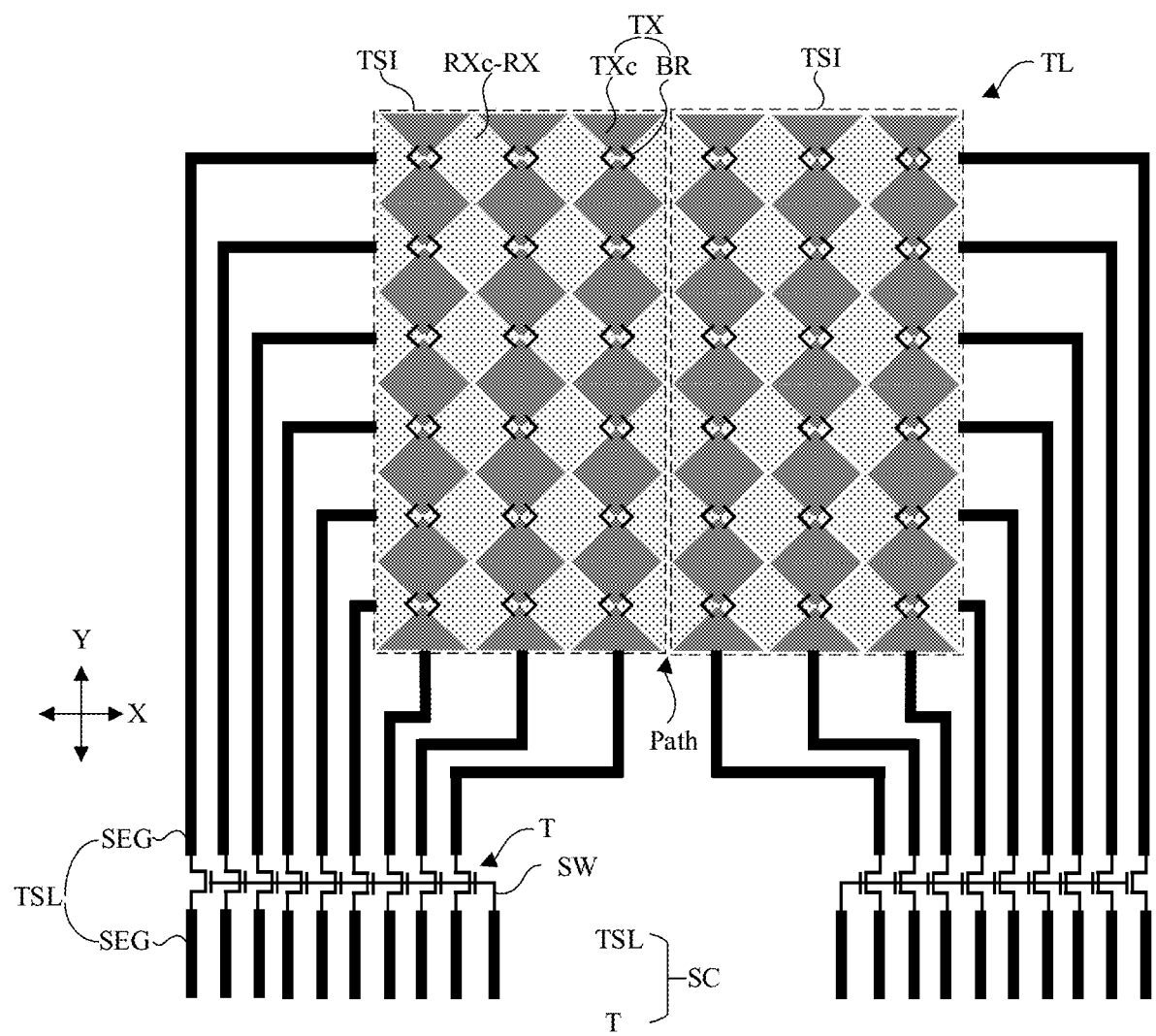
FIG. 5 is a top view of the touch layer and the switching circuit in the touch display panel according to an embodiment of the present disclosure.
Figure 6:
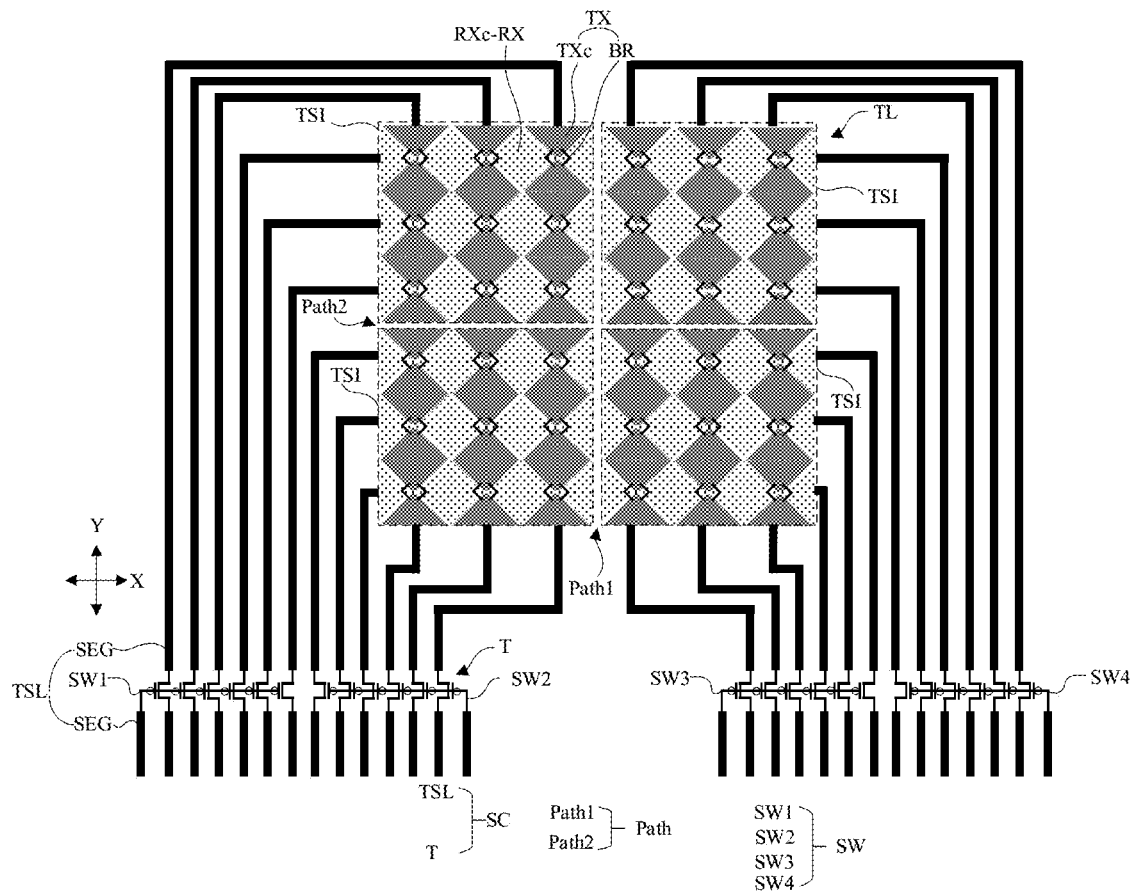
FIG. 6 is a top view of the touch layer and the switching circuit in the touch display panel according to another embodiment of the present disclosure.
Figure 7:
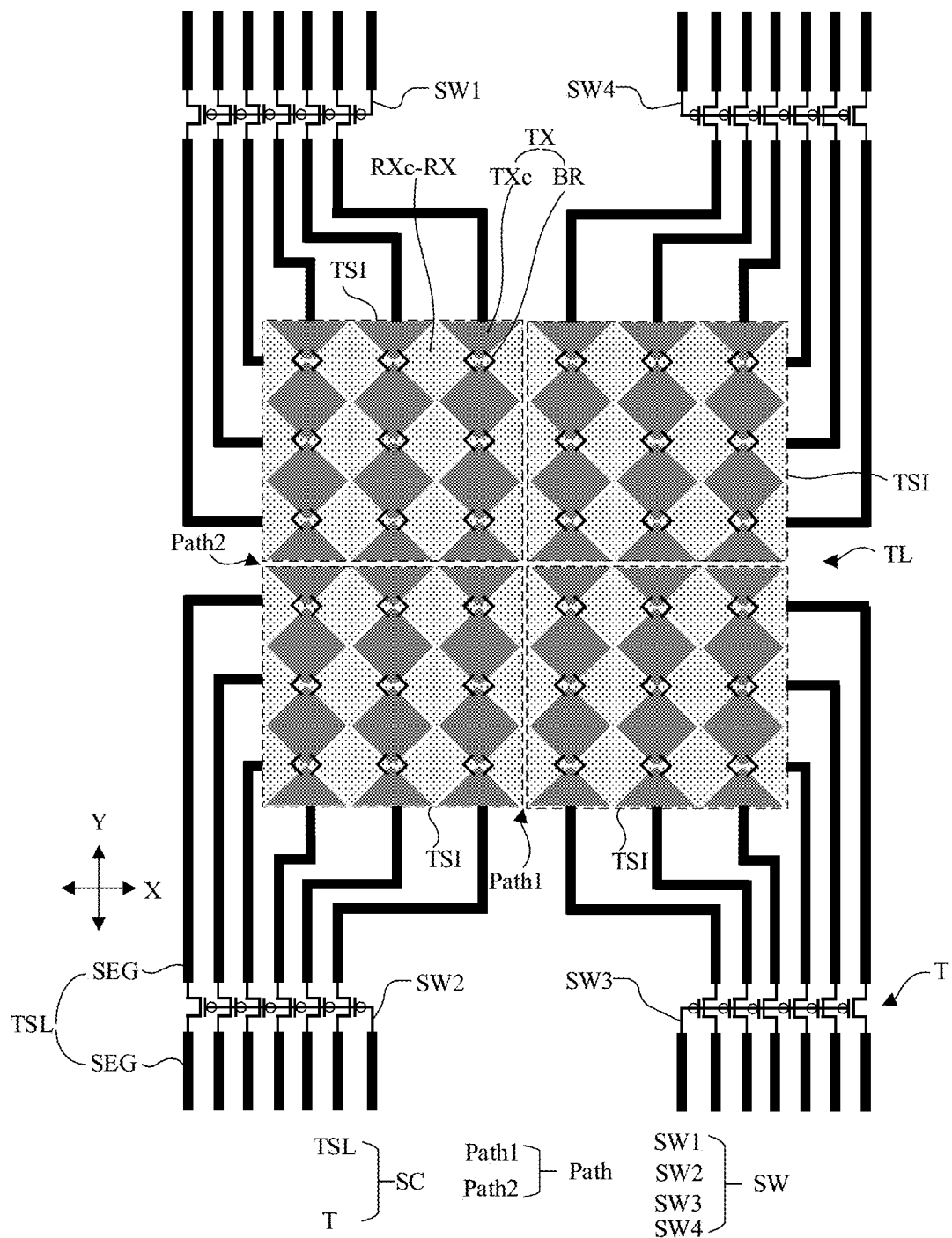
FIG. 7 is a top view of the touch layer and the switching circuit in the touch display panel according to yet another embodiment of the present disclosure.

The above is a description of the structure of one touch island TSI. The structures of other touch island TSIs may be the same as the above structure, and the touch island TSIs are arranged in an array. At the same time, the number of touch electrodes in different touch island TSIs may be the same. As shown in FIGS. 5 to 7, among two adjacent touch islands TSIs in the column direction Y, each first touch electrode TX of one touch island TSI and each first pixel electrode of the other touch island TSI are arranged in a one-to-one correspondence in the column direction Y. The first electrode blocks TXcs of the first touch electrodes TXs corresponding to each other have the same size, and are located in the same column. Among two adjacent touch islands TSIs in the row direction X, the second electrodes RXcs of one touch island TSI and the second touch electrodes RXs of the other touch island TSI are arranged in a one-to-one correspondence in the row direction X. The second electrode blocks RXcs of the second touch electrodes RXs corresponding to each other have the same size, and are located in the same row.

As shown in FIGS. 5 to 7, the first touch electrodes TXs in the same column of two adjacent touch islands TSIs may be formed by a first electrode block TXc of a continuous first touch electrode TX being cut off by a gap Path. The second touch electrodes RXs in the same row of two adjacent touch islands TSIs may be formed by a second electrode block RXc of a continuous second touch electrode RX being cut off by a gap Path. That is to say, the gap Path is located in the electrode layer TMB, and does not completely cut off the touch layer TL along the thickness direction, as long as functionally independent touch islands TSIs can be obtained by division. Accordingly, as shown in FIGS. 6 and 7, the gap Path may include at least one first gap Path1 and at least one second gap Path2. The first gap Path1 may extend along the column direction Y, and the second gap Path2 may extend along the row direction X. The second gap Path2 intersects with the first gap Path1, thereby obtaining multiple touch islands TSIs by division.

It is noted that the gap Path may also have only the first gap Path1 or the second gap Path2. That is to say, the number of touch islands TSIs is not particularly limited here. For example, the number of touch islands TSIs may be two or four.

As shown in FIG. 10, FIG. 10 shows the extension trajectory of the gap Path. The gap Path may extend along a curved or polyline trajectory, which may be formed by disconnecting part of the channel line XL. The curves or polyline extension may function as a blanking function, that is, not being easily observed visually. It is noted that the gap Path nay also extend along a straight trajectory.

As shown in FIGS. 5 to 7, in order to facilitate the control of the operation sequence of each touch island TSI, a switching circuit SC may be set for each touch island TSI. The switching circuit SC connects the sensing electrode of the touch island TSI to the bonding part BON. By controlling the sensing electrode and the bonding part BON to be turned on or off, the acquisition of the sensing signal is started or stopped, thereby controlling whether the touch island TSI realizes the touch function. Specifically, if the touch function of a touch island TSI is to be switched on, the sensing electrode and the bonding part BON may be switched on, so that the sensing signal can be transmitted to the touch chip through the bonding part BON. If a touch island TSI is to be switched off, the sensing electrode and the bonding part BON may be switched off. At this time, the touch island TSI cannot transmit the sensing signal to the touch chip, and thus the touch function cannot be realized.

As shown in FIGS. 5 to 7, the switching circuit SC is at least partially provided in the peripheral area WA, and a touch island TSI is connected to the bonding part BON through a switching circuit SC. In the following, the peripheral area has only one lead-out area FA and one bonding part BON, and a touch island TSI and the switching circuit SC connected thereto are used as an example for illustration.

The switching circuit SC may include at least two touch leads TSLs and switching elements, and any touch electrode may be connected to the bonding part BON through at least one touch lead TSL. For example, a touch electrode may be connected to the bonding part BON through two touch leads TSLs, and the two touch leads TSLs are connected to both ends of the touch electrode in its extension direction. Alternatively, a touch electrode may also be connected to the bonding part BON through a touch lead TSL. At the same time, the touch lead TSL connected to the sensing electrode may be provided with a switching element. Specifically, as shown in FIGS. 5 to 7, the touch lead TSL may include two lead segments SEGs, where one lead segment SEG is connected to the touch electrode and the switching element, and the other lead segment SEG is connected the switching element and the bonding part BON. The switching element may respond to the control signal to switch on or off the touch lead TSL connected thereto.

Further, as shown in FIGS. 5 to 7, the above-mentioned switching element may be a switching transistor T, which may be a thin film transistor. The thin film transistor may be an N-type thin film transistor, so that it can be switched on under a high-level signal. It is noted that the thin film transistor may be a P-type transistor, which can switched on under a low-level signal.

The first terminal SL and the second terminal DL of a switching transistor T are connected to a touch lead TSL. That is, a lead segment SEG of a touch lead TSL is connected to a sensing electrode and the first terminal SL of the switching transistor T, and the other lead segment SEG is connected to the bonding part BON and the second terminal DL of the switching transistor T. The gate of the switching transistor T is used to receive a control signal, thereby switching on the first terminal SL and the second terminal DL thereof.

In some embodiments of the present disclosure, as shown in FIGS. 5-7, the first touch electrode TX may be a driving electrode for receiving a driving signal, and the second touch electrode RX may be a sensing electrode for outputting a sensing signal. The touch lead TSL connected to the first touch electrode TX may not be provided with a switching unit, but the touch lead TSL connected to the second touch electrode RX may be provided with a switching unit. It is noted that a switching unit may also be provided for each touch lead TSL. That is to say, each touch lead TSL in the switching circuit SC may be provided with a switching unit, which may not only control the output of the sensing signal, but also control the input of the driving signal.

In other embodiments of the present disclosure, each touch electrode is a sensing electrode and may output a sensing signal. For example, when an active pen is used for the touch operation, both the first touch electrode TX and the second touch electrode RX may generate sensing signals. At this time, a switching unit may also be provided for each touch lead TSL.

As shown in FIGS. 5 to 7, in order to facilitate the control of a touch island TSI to switch on or off, the switching circuit SC may also include a switching scan line SW. In a switching circuit SC, the switching scan line SW may be connected in series with the gate of each switching transistor T and is connected to the bonding part BON for transmitting control signals, so that all the switching transistors Ts in the switching circuit SC can be switched on or off at the same time. It is noted that multiple switching scan lines SWs may also be provided, and each switching scan line SW is connected to the switching gate SGA of some of the switching transistors T.

Figure 12:
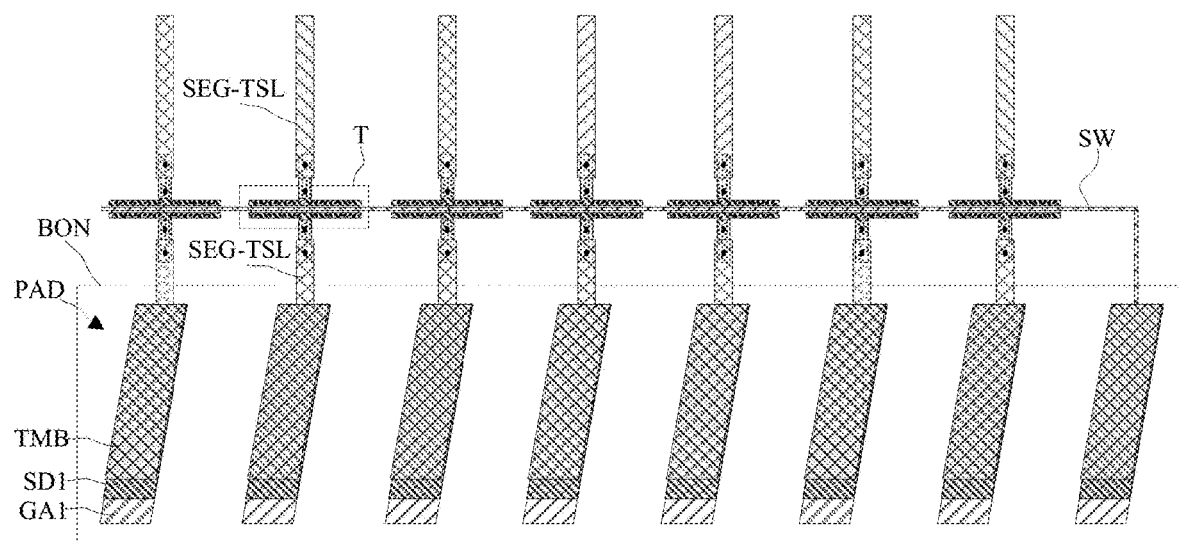
FIG. 12 is a partial top view of the lead-out area of the touch display panel according to an embodiment of the present disclosure.

As shown in FIGS. 2 and 12, the bonding part BON may include at least two pads, and a touch lead TSL is connected to a pad PAD, and a switching scan line SW is also connected to a pad PAD. Each pad PAD may be bonded to a flexible circuit board, so that the touch chip can receive/send signals to the touch electrodes through the flexible circuit board.

In other embodiments of the present disclosure, as shown in FIG. 7, there are multiple lead-out areas FAs, and each lead-out area FA may be provided with a bonding part BON. In this case, the bonding parts BONs connected to different touch islands TSI may be different. For example, two lead-out areas FAs may be set, corresponding to two bonding parts BONs. Some of the touch islands TSIs may be connected to one bonding part BON through the switching circuit SC, and the remaining ones of the touch islands TSIs may be connected through the switch circuit SC to another bonding part BON.

The following is a detailed description of the stacked structure based on the switching transistor T.

Figure 11:
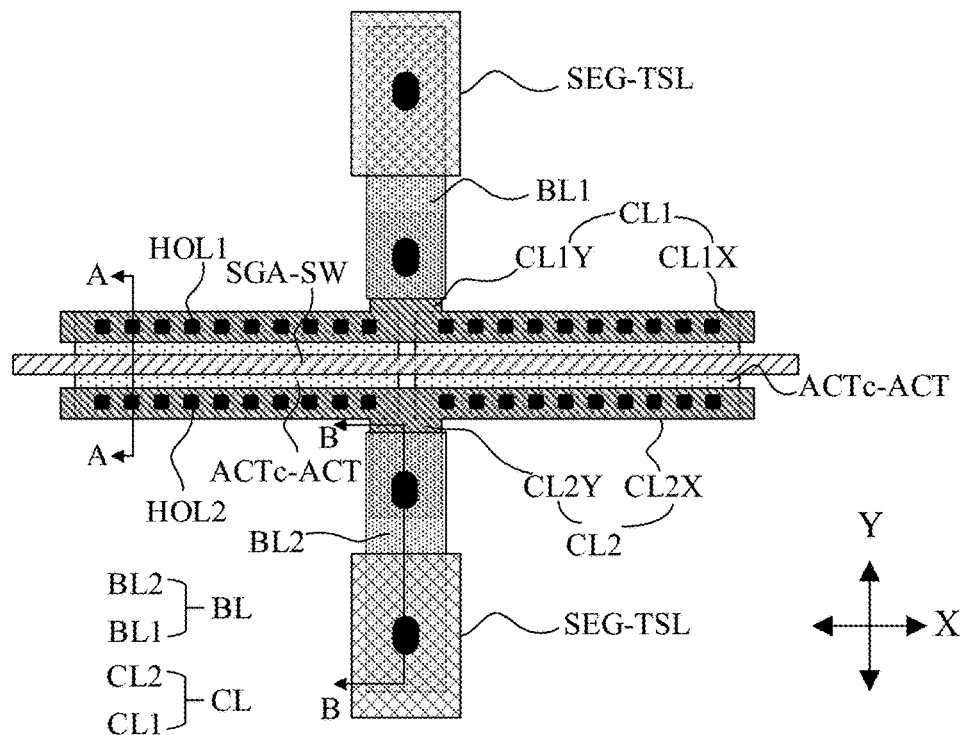
FIG. 11 is a partial top view of the switching transistor in the touch display panel according to an embodiment of the present disclosure.
Figure 13:
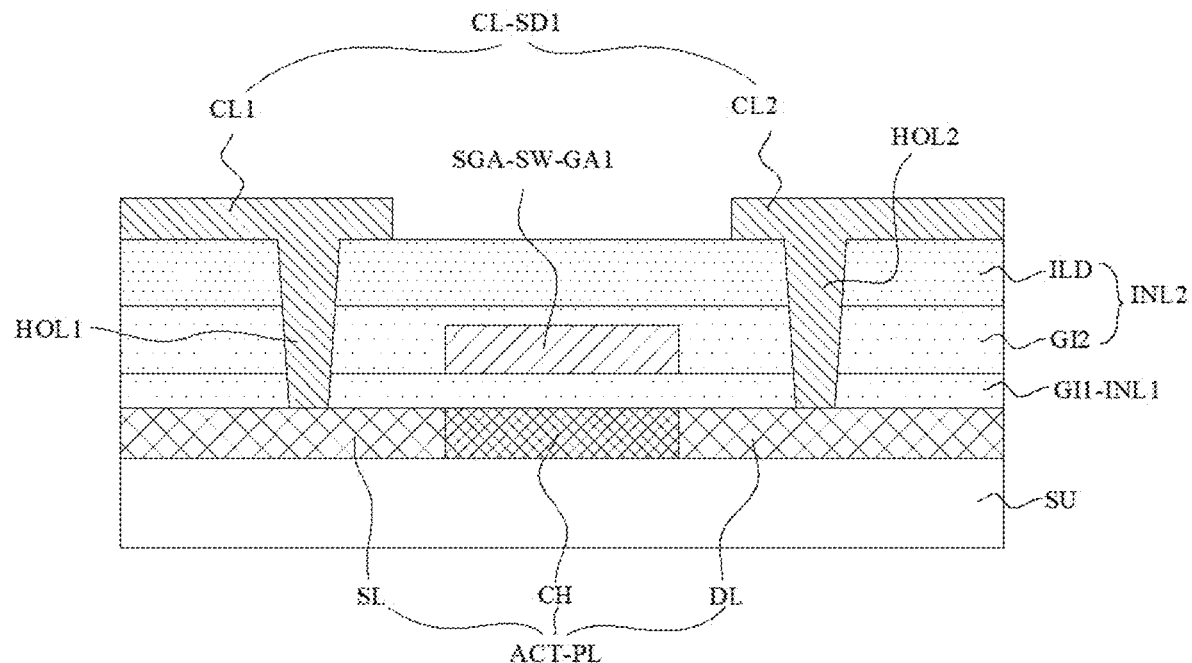
FIG. 13 is a cross-sectional view along line A-A of FIG. 11.

As shown in FIGS. 11 and 12, the switching transistor T may include a switching active layer ACT and a switching gate SGA. In order to reduce the thickness, the switching transistor T may be at least partially located within the display substrate PNL. While the display substrate PNL is formed, at least part of the switching transistor T may be formed, as shown in FIG. 13. For example, the touch display panel may include a switching active layer ACT, a first insulation layer INL1, a switching gate SGA, and a second insulation layer INL2.

The switching active layer ACT may be provided in the display substrate PNL. The switching active layer ACT may include a channel region CH and a first terminal SL and a second terminal DL located on both sides of the channel region CH. The first terminal SL and the second terminal DL may be formed by only performing a doping process on a semiconductor material.

The first insulation layer INL1 may cover the active layer. The first insulation layer INL1 may be a single-layer or multi-layer structure, and its material may include insulation materials such as silicon nitride and silicon oxide.

The switching gate SGA may be disposed on the surface of the first insulation layer INL1 away from the switching active layer ACT and overlap with the switching active layer ACT. That is, the orthographic projections on the substrate SU of the switching gate SGA and the channel region CH of the switching active layer ACT at least partially coincide with each other. At the same time, the first terminal SL and the second terminal DL of the switching active layer ACT do not overlap with the switching gate SGA. The switching gate SGA may be connected to the switching scan line SW to receive the switching scan signal.

The second insulation layer INL2 may cover the switching gate SGA. It may also have a single-layer or multi-layer structure, and its material may include insulation materials such as silicon nitride and silicon oxide.

As shown in FIG. 12, each switching transistor T may be located in the lead-out area FA, and located between the bonding part BON and the display area AA. The touch lead TSL may be located on a side of the second insulation layer INL2 away from the switching active layer ACT, and includes two lead segments SEGs arranged at intervals along the column direction Y. One lead segment SEG connects the touch electrode and the first terminal SL, and the other lead segment SEG connects the second terminal DL and the bonding part BON.

Figure 14:
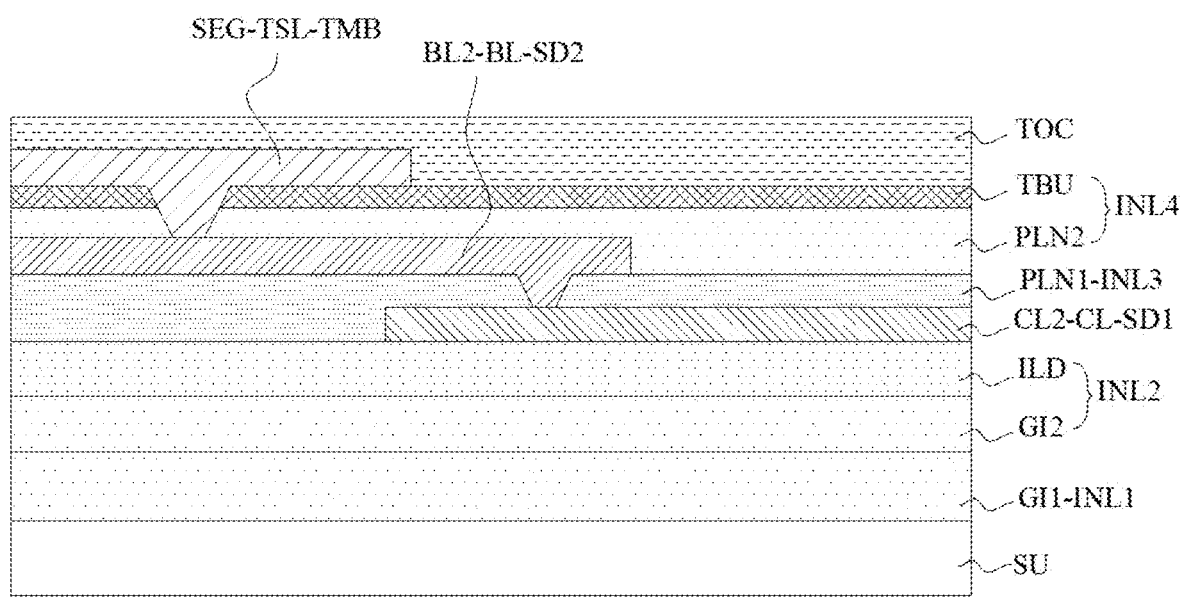
FIG. 14 is a cross-sectional view along line B-B of FIG. 11.

In addition, as shown in FIGS. 11, 12, and 14, the touch display panel may also include a first conductive layer CL, a third insulation layer INL3, a second conductive layer BL, and a fourth insulation layer INL4.

The first conductive layer CL may be disposed on a surface of the second insulation layer INL2 away from the switching active layer ACT, and may include a first conductive part CL1 and a second conductive part CL2 arranged at intervals along the column direction Y. The first conductive part CL1 overlaps with the first terminal SL. That is, the orthographic projections on the substrate SU of the first conductive part CL1 and the first terminal SL at least partially coincide with each other. The second conductive part CL2 overlaps with the second terminal DL. That is, the orthographic projections on the substrate SU of the second conductive part CL2 and the second terminal DL at least partially coincide with each other. At the same time, the second insulation layer INL2 has a first contact hole HOL1 and a second contact hole HOL2 penetrating the second insulation layer INL2. The first conductive part CL1 and the first terminal SL may be connected through the first contact hole HOL1. The conductive part CL2 and the second terminal DL may be connected through the second contact hole HOL2.

Further, as shown in FIGS. 11 and 13, in some embodiments of the present disclosure, the first conductive part CL1 includes a first connection part CL1X and a second connection part CL1Y connected along the column direction Y. The first connection part CL1X extends along the row direction, and overlaps and is connected with the first terminal SL through the first contact hole HOL1. The second connection part CL1Y is connected to the side of the first connection part CL1X away from the second conductive part CL2, and extends along the column direction Y, thereby forming a "T" shaped structure with the first connection part CL1X.

The second conductive part CL2 includes a third connection part CL2X and a fourth connection part CL2Y connected along the column direction Y. The third connection part CL2X extends along the row direction X, and overlaps and is connected with the second terminal DL through the second contact hole HOL2. The fourth connection part CL2Y is connected to the side of the third connection part CL2X away from the first conductive part CL1, and extends along the column direction Y, thereby forming a "T" shaped structure with the third connection part CL2X.

The third insulation layer INL3 may cover the first conductive layer CL. The third insulation layer INL3 may have a single-layer or multi-layer structure, and its material may include inorganic insulation materials such as silicon nitride and silicon oxide, or organic insulation materials such as resin.

The second conductive layer BL may be disposed on a side of the first conductive layer CL away from the switching active layer ACT, and includes a third conductive part BL1 and a fourth conductive part BL2 arranged at intervals along the column direction Y. The third conductive part BL1 overlaps with the first conductive part CL1. That is, the orthographic projections on the substrate SU of the third conductive part BL1 and the first conductive part CL1 at least partially coincide with each other. The fourth conductive part BL2 overlaps with the second conductive part CL2. That is, the orthographic projections on the substrate SU of the fourth conductive part BL2 and the second conductive part CL2 at least partially coincide with each other. At the same time, the third conductive part BL1 and the first conductive part CL1 may be connected through the contact hole, and the fourth conductive part BL2 and the second conductive part CL2 may be connected through the contact hole.

As shown in FIG. 11, the second connection part CL1Y and the third conductive part BL1 are connected through the contact hole; and the fourth connection part CL2Y and the fourth conductive part BL2 are connected through the contact hole.

The fourth insulation layer INL4 may cover the second conductive layer BL. The fourth insulation layer INL4 may be a single-layer or multi-layer structure, and its materials may include inorganic insulation materials such as silicon nitride and silicon oxide, and may also include organic insulation materials such as resin.

As shown in FIGS. 2, 12, and 14, the transfer layer BRL of the touch layer TL may be located in the display area AA, and the touch lead TSL may be located on the side of the fourth insulation layer INL4 away from the switching active layer ACT. One lead segment SEG is connected to the first terminal SL through the third conductive part BL1 and the first conductive part CL1, and the other lead segment SEG is connected to the second terminal DL through the fourth conductive part BL2 and the second conductive part CL2, thereby connecting the touch lead TSL to the switching transistor T.

Further, in order to simplify the process, reduce costs, and avoid increasing the thickness of the touch display panel, some film layers of the display substrate PNL may be formed simultaneously with the above-mentioned switching active layer ACT to fourth insulation layer INL4, as shown in FIGS. 3, 4, 13, and 14. For example, the switching active layer ACT may be located in the semiconductor layer PL of the driving backplane BP, and thus may be formed simultaneously with the semiconductor layer PL. That is to say, the switching active layer ACT and the active layer of each transistor of the pixel circuit are located in the semiconductor layer PL. The first insulation layer INL1 may be located on the first gate insulation layer GI1 of the display substrate PNL, and thus may be formed simultaneously with the first gate insulation layer GI1. The switching gate SGA may be located on the first gate layer GA1, and thus may be formed simultaneously with the first gate layer GA1. The second insulation layer INL2 may have a multi-layer structure. The second gate insulation layer GI2 and the interlayer dielectric layer ILD may extend into the lead-out area FA, and be stacked in the lead-out area FA. The second insulation layer INL2 includes the second gate insulation layer GI2 and the interlayer dielectric layer ILD stacked within the lead-out area FA. The second gate insulation layer INL2 includes part of the second gate insulation layer GI2 and part of the interlayer dielectric layer ILD.

The first conductive layer CL may be located on the first source and drain layer SD1, and thus may be formed simultaneously with the first source and drain layer SD1. The third insulation layer INL3 may be located on the first planarization layer PLN1. The third insulation layer INL3 is part of the first planarization layer PLN1 located in the lead-out area FA, and thus may be formed at the same time. The second conductive layer BL may be located on the second source and drain layer SD2, and thus may be formed simultaneously with the second source and drain layer SD2. The second planarization layer PLN2 and the touch buffer layer TBU may both extend into the lead-out area FA, and may be stacked in the lead-out area FA. The fourth insulation layer INL4 may be a multi-layer structure, which may include parts of the second planarization layer PLN2 and the touch buffer layer TBU stacked in the lead-out area FA. That is, the fourth insulation layer INL4 may include part of the second planarization layer PLN2 and part of the touch buffer layer TBU. The touch lead TSL may be located on a surface of the touch buffer layer TBU away from the substrate SU, and may be disposed on the same layer as the electrode layer TMB.

In addition, as shown in FIGS. 3, 4, 12, and 14, the pad PAD of the bonding part BON may adopt a multi-layer structure. For example, the pad may include three conductive film layers, each being located on the same layer with the first gate layer GA1, the first source and drain layer SD1, and the electrode layer TMB. The three conductive film layers are connected. The touch lead TSL and the electrode layer TMB are located on the same layer. The lead segment SEG connecting the pad PAD may be an integral structure with the conductive film layer of the pad PAD on the same layer as the electrode layer TMB. When bonded to the flexible circuit board, the conductive film layer of the pad PAD on the same layer as the electrode layer TMB may be conductively connected to the flexible circuit board.

The following takes a switching transistor T as an example to describe in detail patterns of some film layers of the switching transistor T.

As shown in FIGS. 11, 13, and 14, the switching active layer ACT may extend along the row direction X, and the first terminal SL and the second terminal DL may be arranged on both sides of the channel region CH along the column direction Y. The second terminal DL is located between the channel region CH and the bonding part BON. At the same time, both the first terminal SL and the second terminal DL may extend along the row direction X, and have the same length in the row direction X.

The switching scan line SW may be an integral structure with the switching gate SGA, extend at least partially along the row direction X, and overlap with the channel region CH of the switching active layer ACT, so as to form the switching transistor T.

The first contact holes HOL1s connecting the first connection part CL1X and the first terminal SL may be at least two, and may be arranged at intervals along the row direction X. The second contact holes HOL2s connecting the third connection part CL2X and the second terminal DL may be at least two, and may be arranged at intervals along the row direction X. With at least two first contact holes HOL1s and second contact holes HOL2s, the connection area can be increased and the conductive performance can be improved.

As shown in FIG. 11, the length of the switching active layer ACT in the row direction X is greater than the width of the touch lead TSL in the row direction, and is also larger than the widths of the third conductive part BL1 and the fourth conductive part BL2 in the rwo direction X, and is further larger than the widths of the second connection part CL1Y and the fourth connection part CL2Y in the row direction X, so as to increase the channel length. At the same time, the switching active layer ACT may be an integral structure. Alternatively, the switching active layer ACT may also include at least two active portions ACTes arranged at intervals along the row direction X, and each active portion ACTc is connected to the first conductive part CL1 and the second conductive part CL2, thereby avoiding the occurrence of an excessively large area of semiconductor material. The distance between two adjacent active portions ACTes is smaller than the width of the touch lead TSL in the row direction X.

After experimental verification, the present inventor(s) concluded that the disclosed solution can improve the signal-to-noise ratio and improve the problem of poor touch accuracy.

Figures 15, 16:
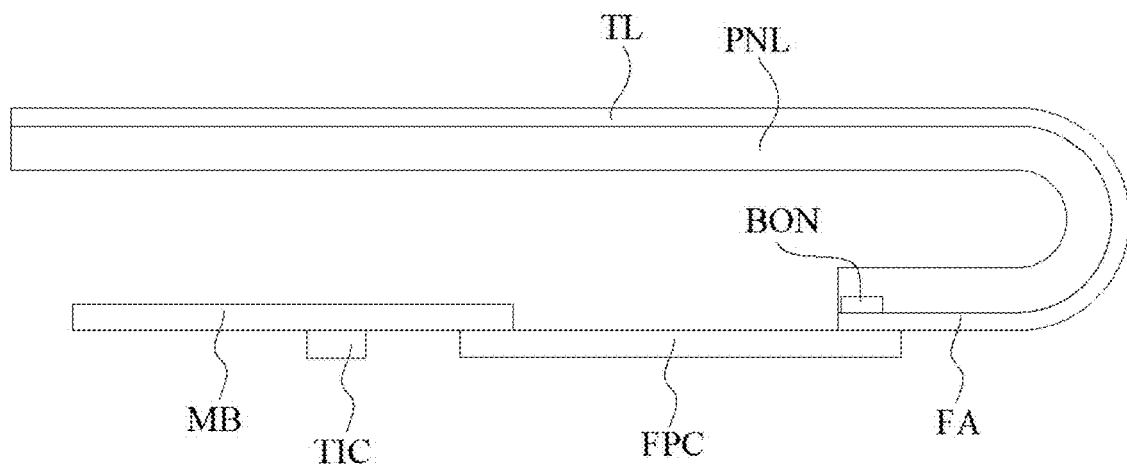
FIG. 15 is a table view showing the experimental data of three sizes (8.1 inch, 14.2 inch, and 17.3 inch) using an active pen for the touch operation in the case of not adopting the solution of the present disclosure and in the case of adopting the solution of the present disclosure.
FIG. 16 is a schematic diagram of a display device according to an embodiment of the present disclosure.

The specific experimental results are shown in FIG. 15, which gives the experimental data of three sizes (8.1 inch, 14.2 inch, and 17.3 inch) using an active pen for the touch operation in the case of not adopting the solution of the present disclosure and in the case of adopting the solution of the present disclosure.

Chanel refers to the length of the touch electrode in the column direction; and Trace refers to the length of the touch lead.

Cp-normal is the coupling capacitance (noise) between the display substrate PNL and the touch electrode when the solution of the present disclosure is not adopted; and Cp-partition detection is the coupling capacitance (noise) between the display substrate PNL and the touch electrode when the solution of the present disclosure is adopted.

The active pen SNR-normal is the signal-to-noise ratio when using the active pen for the touch operation when the solution of the present disclosure is not adopted; and the active pen SNR-partition is the signal-to-noise ratio when using the active pen for the touch operation when the solution of the present disclosure is adopted.

It can be seen from the data in the above table that as the size of the touch display panel increases, Chanel increases, the noise Vnoise in the active pen SNR-normal increases, and the active pen SNR-normal decreases. After the solution of the present disclosure is adopted, the noise Vnoise in the active pen SNR-normal is significantly reduced, so that the active pen SNR-partition detection is increased, and it may be greater than two times of the active pen SNR-normal.

The present disclosure provides a driving method for a touch display panel. The touch display panel is a touch display panel according to any of the above embodiments, and its structure will not be described in detail here. At the same time, the touch islands of the touch display panel may be divided into multiple groups, and the number of the touch islands in each group is one or more.

The driving method of the present disclosure may include: within one touch period, sequentially switching on the switching circuits of the bonding part and each group of the touch islands, and sequentially acquiring the sensing signal generated by each group of the touch islands; and determining the touch position based on the sensing signal.

That is to say, within a touch period, only the sensing signal of one group of the touch islands is received at a single time moment. After the touch signal of each group of the touch islands is received in sequence, the touch period ends.

Specifically, within a touch period, each switching transistor T of the switching circuit SC of one group of the touch islands TSIs can be switched on at a single time moment. At this time, the touch chip cannot receive the sensing signals of other groups of the touch islands TSIs. If the touch lead TSL of each touch electrode is connected to the switching transistor T, the driving signal cannot be output to other touch islands TSIs.

In some embodiments of the present disclosure, as shown in FIGS. 6 and 7, the number of the touch islands is four, and one touch island TSI forms a group. Correspondingly, the number of the switching circuits SCs is also four, the switching transistors T of each switching circuit are connected in series through a switching scan line SW, and each switching transistor T is P-type. Thus, the number of the switching scan lines SWs is four, namely SW1, SW2, SW3, and SW4 in FIGS. 6 and 7. Therefore, each touch island TSI can be controlled to output sensing signals in sequence by inputting control signals to each switching scan line SW in sequence.

Figure 8:
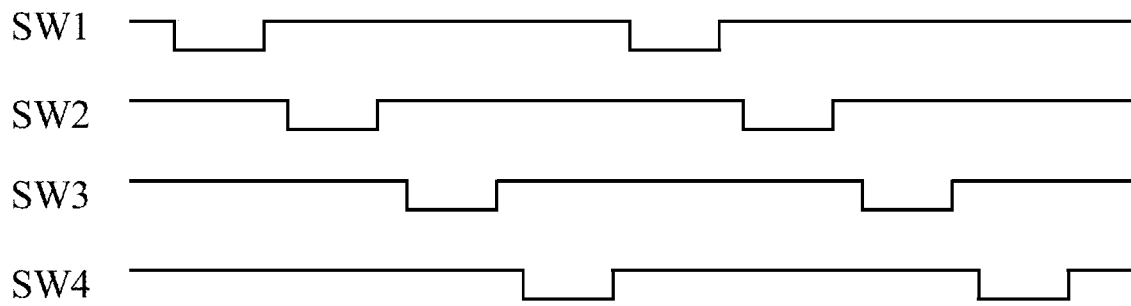
FIG. 8 is a driving timing diagram of a touch display panel according to an embodiment of the present disclosure.

As shown in FIG. 8, it shows the timing of the control signal of each switching scan line (SW1, SW2, SW3, and SW4) in the same touch period. It can be seen that according to the timing shown in FIG. 8, the touch islands TSIs connected by each switching scan line SW1, SW2, SW3, and SW4 are switched on one by one, and each group of the touch islands TSIs includes one touch island TSI.

In other embodiments of the present disclosure, two touch islands TSIs form one group, and positions of the two touch islands TSIs in the same group are not particularly limited. The switching scan lines SWs of the switching circuits SCs of the touch islands TSIs in the same group can receive control signals at the same time, allowing the two touch islands TSIs to output sensing signals at the same time.

Figure 9:
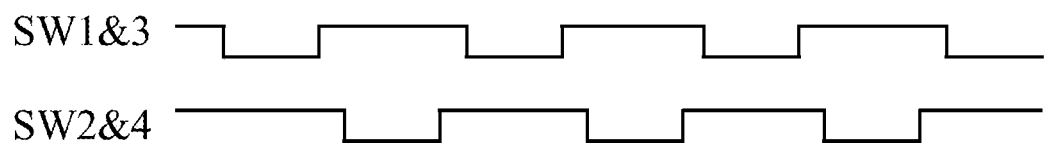
FIG. 9 is a driving timing diagram of a touch display panel according to another embodiment of the present disclosure.

As shown in FIG. 9, it shows the timing of the control signal of each switching scan line (SW1, SW2, SW3, and SW4) in the same touch period. It can be seen that according to the timing shown in FIG. 9, the touch islands TSIs connected by the switching scan lines SW1 and SW3 form a group, and are switched on at the same time. The touch island TSIs connected by the switching scan lines SW2 and SW4 form a group, and are switched on at the same time.

It should be noted that although various steps of the driving method in the present disclosure are described in a specific order in the drawings, this does not require or imply that these steps must be performed in this specific order, or that all the steps shown must be performed to achieve the desired results. Additionally or alternatively, certain steps may be omitted, multiple steps may be combined into one step for execution, and/or one step may be decomposed into multiple steps for execution, etc.

As shown in FIG. 16, embodiments of the present disclosure also provide a display device, which may include a touch display panel, a flexible circuit board FPC, and a touch chip T1C.

The touch display panel may be the touch display panel in any of the above embodiments, and its specific structure will not be described again here. One end of the flexible circuit board FPC may be connected to the bonding part BON, and the other end may be connected to a control circuit board MB. The touch display panel may be controlled by the control circuit board MB. The touch chip T1C may be located on the flexible circuit board FPC or the control circuit board MB, but it must be connected to the flexible circuit board FPC in order to receive the sensing signal and determine the touch position.

In some embodiments of the present disclosure, both the display substrate PNL and the touch layer TL may be bent in the lead-out area, so that the bonding part BON is located on the side of the display substrate PNL away from the touch layer TL.

It is noted that in other embodiments of the present disclosure, the display substrate PNL may not be bent, and the flexible circuit board FPC may be bent so that the bonding part BON is located on the side of the display substrate PNL away from the touch layer TL. Alternatively, neither the display substrate PNL nor the flexible circuit board FPC is bent.

The display device of the present disclosure may be an electronic device with a touch display function such as a mobile phone, a tablet computer, a television, etc., which are not listed here. For its beneficial effects, reference may be made to the above embodiments of the touch display panel, which will not be repeated here.

In addition, the present disclosure also provides a touch display system, which may include a display device and a stylus. The display device may be a completed display device, and the stylus may be an active pen or a passive pen.

Other embodiments of the disclosure will be readily apparent to those skilled in the art from consideration of the specification and practice of the content disclosed herein. The present application is intended to cover any variations, uses, or adaptations of the present disclosure that follow the general principles of the present disclosure and include common knowledge or customary technical means in the technical field that are not disclosed in the present disclosure. It is intended that the specification and examples be considered as exemplary only, with the true scope and spirit of the present disclosure being indicated by the following claims.

The invention claimed is:

1. A touch display panel, comprising a display area and a peripheral area located outside the display area, wherein part of the peripheral area protrudes in a direction away from the display area to form at least one lead-out area, and the lead-out area has a bonding part,
   the touch display panel comprises:
   a display substrate;
   a touch layer, provided on a side of the display substrate and comprising at least two touch islands arranged in an array, wherein there is a gap between two adjacent touch islands, each touch island comprises at least two touch electrodes, and the touch electrodes comprise at least two sensing electrodes for outputting sensing signals; and
   switching circuits, at least partially provided in the peripheral area, wherein one of the touch islands is connected to the bonding part through one of the switching circuits, and the switching circuits are at least used for switching on or off the sensing electrodes and the bonding part, wherein
   in one of the touch islands, the touch electrodes comprise at least two first touch electrodes, wherein the first touch electrodes extend in a column direction and are arranged at intervals along a row direction;
   one of the first touch electrodes comprises at least two first electrode blocks arranged at intervals along the column direction and transfer bridges connecting two adjacent first electrode blocks; and
   the gap cuts off part of a first electrode block and extends along a curved or polyline trajectory,
   wherein in the one of the touch islands;
   the touch electrodes further comprise at least two second touch electrodes, the second touch electrodes extend along the row direction and are arranged at intervals along the column direction, and any of the first touch electrodes intersects with, but is insulated from, each of the second touch electrodes; and
   each of the first touch electrodes is a driving electrode for receiving a driving signal, and each of the second touch electrodes is one of the sensing electrodes,
   wherein one of the second touch electrodes comprises at least two second electrode blocks connected in series along the row direction;
   one of the transfer bridges intersects with one of the second touch electrodes; and
   the touch layer comprises:
   a transfer layer, provided on a side of the display substrate and comprising the transfer bridges;
   an isolation layer covering the transfer layer; and
   an electrode layer, provided on a surface of the isolation layer away from the display substrate, and comprising the first electrode block and a second electrode block.

2. The touch display panel according to claim 1, wherein
each of the switching circuits comprises at least two touch leads and a switching element, any of the touch electrodes being bonded to the bonding part through one of the touch leads; and
one of the touch leads connected to one of the sensing electrodes is provided with the switching element, the switching element being used for switching on or off one of the touch leads connected to the switching element in response to a control signal.

3. The touch display panel according to claim 2, wherein
the switching element is a switching transistor, a first terminal and a second terminal of the switching transistor being connected to one of the touch leads, and a gate of the switching transistor being used for receiving the control signal.

4. The touch display panel according to claim 3, wherein
each of the switching circuits further comprises a switching scan line; and
in each of the switching circuits, the switching scan line is connected in series with the gate of the switching transistor, and is further connected with the bonding part, for transmitting the control signal.

5. The touch display panel according to claim 4, wherein the touch display panel comprises:
a switching active layer, provided in the display substrate, and comprising a channel region and the first terminal and the second terminal on both sides of the channel region;
a first insulation layer covering the active layer;
a switching gate, provided on a surface of the first insulation layer away from the switching active layer and overlapping with the switching active layer to form the switching transistor, the switching gate being connected with the switching scan line; and
a second insulation layer covering the switching gate, wherein
the touch lead is located on a side of the second insulation layer away from the switching active layer, and comprises two lead segments arranged at intervals along the column direction, wherein one of the lead segments is connected to the touch electrode and the first terminal, and the other of the lead segments is connected to the second terminal and the bonding part.

6. The touch display panel according to claim 5, wherein
the switching active layer extends along the row direction, and the first terminal and the second terminal are arranged on both sides of the channel region along the column direction, and the second terminal is located between the channel region and the bonding part; and
the switching scan line and the switching gate form an integral structure, extend along the row direction, and overlap with the channel region of the switching active layer.

7. The touch display panel according to claim 6, wherein the touch display panel further comprises:
a first conductive layer, provided on a surface of the second insulation layer away from the switching active layer, and comprises a first conductive part and a second conductive part arranged at intervals along the column direction, wherein the first conductive part overlaps and is connected through a first contact hole with the first terminal, and the second conductive part overlaps and is connected through a second contact hole with the second terminal;

a third insulation layer covering the first conductive layer;
a second conductive layer, provided on a surface of the third insulation layer away from the switching active layer, and comprising a third conductive part and a fourth conductive part arranged at intervals along the column direction, wherein the third conductive part overlaps and is connected with the first conductive part, and the fourth conductive part overlaps and is connected with the second conductive part; and
a fourth insulation layer covering the second conductive layer, wherein
the touch lead is located on a side of the fourth insulation layer away from the switching active layer, the lead segment connecting the touch electrode is connected with the third conductive part, and the lead segment connecting the bonding part is connected with the fourth conductive part.

8. The touch display panel according to claim 7, wherein
the first conductive part comprises a first connection part and a second connection part connected along the column direction, wherein the first connection part extends along the row direction, the first connection part overlaps and is connected through the first contact hole with the first terminal, the second connection part is connected to a side of the first connection part away from the second conductive part, the second connection part extends along the column direction, and the second connection part is connected to the third conductive part; and
the second conductive part comprises a third connection part and a fourth connection part connected along the column direction, the third connection part extends along the row direction, the third connection part overlaps and is connected through the second contact hole with the second terminal, the fourth connection part is connected to a side of the third connection part away from the first conductive part and extends along the column direction, and the fourth connection part is connected to the fourth conductive part.

9. The touch display panel according to claim 8, wherein
the first connection part is connected to the first terminal through at least two first contact holes arranged at intervals along the row direction, and the second connection part is connected to the second terminal through at least two second contact holes arranged at intervals along the row direction.

10. The touch display panel according to claim 8, wherein
a length of the switching active layer in the row direction is greater than widths of the touch lead, the second connection part, the fourth connection part, the third conductive part, and the fourth conductive part in the row direction.

11. The touch display panel according to claim 7, wherein
the switching active layer comprises at least two active portions arranged at intervals along the row direction, and each of the active portions overlaps with the switching scan line and is connected to the first conductive part and the second conductive part.

12. The touch display panel according to claim 7, wherein
the display substrate comprises a driving backplane, a light-emitting layer, and an encapsulation layer stacked in sequence, the touch layer being located on a side of the encapsulation layer away from the driving backplane; and the driving backplane comprises:

a substrate;

a semiconductor layer, provided on a side of the substrate, the switching active layer being located on the semiconductor layer;

a first gate insulation layer covering the semiconductor layer, the first insulation layer being located on the gate insulation layer;

a first gate layer, provided on a surface of the gate insulation layer away from the substrate, the switching gate being located on the first gate layer;

a second gate insulation layer covering the first gate layer;

a second gate layer, provided on a surface of the second gate insulation layer away from the substrate;

an interlayer dielectric layer covering the second gate layer, the second insulation layer comprising part of the gate insulation layer and part of the interlayer dielectric layer;

a first source and drain layer, provided on a surface of the interlayer dielectric layer away from the substrate, the first conductive layer being located on the first source and drain layer;

a first planarization layer covering the first source and drain layer, the third insulation layer being located on the first planarization layer;

a second source and drain layer, provided on a surface of the first planarization layer away from the substrate, the second conductive layer being located on the second source and drain layer;

a second planarization layer covering the second source and drain layer, wherein the light-emitting layer is provided on a surface of the second planarization layer away from the substrate, and both the light-emitting layer and the encapsulation layer expose the lead-out area; and a touch buffer layer covering a area where the light-emitting layer and the second planarization layer are located in the lead-out area, wherein the touch layer is provided on a surface of the touch buffer layer away from the substrate, and the fourth insulation layer comprises part of the second planarization layer and part of the touch buffer layer.

13. The touch display panel according to claim 12, wherein the bonding part comprises at least two pads, one of the touch leads is connected to one of the pads, and the switching scan line is connected to one of the pads.

14. The touch display panel according to claim 1, wherein each of the touch electrodes is one of the sensing electrodes.

15. The touch display panel according to claim 1, wherein the gap is located in the electrode layer and further cuts off part of the second electrode block.

16. The touch display panel according to claim 1, wherein the gap comprises at least one first gap and at least one second gap, the first gap extends along the column direction, and the second gap extends along the row direction and intersects with the first gap.

17. A driving method for a touch display panel, wherein the touch display panel comprises a display area and a peripheral area located outside the display area, wherein part of the peripheral area protrudes in a direction away from the display area to form at least one lead-out area, and the lead-out area has a bonding part, the touch display panel comprises:

a display substrate;

a touch layer, provided on a side of the display substrate and comprising at least two touch islands arranged in an array, wherein there is a gap between two adjacent touch islands, each touch island comprises at least two touch electrodes, and the touch electrodes comprise at least two sensing electrodes for outputting sensing signals; and switching circuits, at least partially provided in the peripheral area, wherein one of the touch islands is connected to the bonding part through one of the switching circuits, and the switching circuits are at least used for switching on or off the sensing electrodes and the bonding part, the touch islands comprise a plurality of groups of the touch islands, each group comprises one or more of the touch islands; and the driving method comprises:

within a touch period, sequentially switching on the switching circuits of the bonding part and each group of the touch islands, and sequentially acquiring a sensing signal generated by each group of the touch islands; and determining a touch position according to the sensing signal, wherein in one of the touch islands, the touch electrodes comprise at least two first touch electrodes, wherein the first touch electrodes extend in a column direction and are arranged at intervals along a row direction;

one of the first touch electrodes comprises at least two first electrode blocks arranged at intervals along the column direction and transfer bridges connecting two adjacent first electrode blocks; and the gap cuts off part of a first electrode block and extends along a curved or polyline trajectory, wherein in the one of the touch islands:

the touch electrodes further comprise at least two second touch electrodes, the second touch electrodes extend along the row direction and are arranged at intervals along the column direction, and any of the first touch electrodes intersects with, but is insulated from, each of the second touch electrodes; and each of the first touch electrodes is a driving electrode for receiving a driving signal, and each of the second touch electrodes is one of the sensing electrodes, wherein one of the second touch electrodes comprises at least two second electrode blocks connected in series along the row direction;

one of the transfer bridges intersects with one of the second touch electrodes; and the touch layer comprises:

a transfer layer, provided on a side of the display substrate and comprising the transfer bridges;

an isolation layer covering the transfer layer; and an electrode layer, provided on a surface of the isolation layer away from the display substrate, and comprising the first electrode block and a second electrode block.

18. A display device, comprising:

a touch display panel;

a flexible circuit board, connected to a bonding part; and a touch chip, connected to the flexible circuit board, wherein the touch display panel comprises a display area and a peripheral area located outside the display area, wherein part of the peripheral area protrudes in a direction away from the display area to form at least one lead-out area, and the lead-out area has the bonding part, the touch display panel comprises:
a display substrate;
a touch layer, provided on a side of the display substrate and comprising at least two touch islands arranged in an array, wherein there is a gap between two adjacent touch islands, each touch island comprises at least two touch electrodes, and the touch electrodes comprise at least two sensing electrodes for outputting sensing signals; and
switching circuits, at least partially provided in the peripheral area, wherein one of the touch islands is connected to the bonding part through one of the switching circuits, and the switching circuits are at least used for switching on or off the sensing electrodes and the bonding part, wherein
in one of the touch islands, the touch electrodes comprise at least two first touch electrodes, wherein the first touch electrodes extend in a column direction and are arranged at intervals along a row direction;
one of the first touch electrodes comprises at least two first electrode blocks arranged at intervals along the column direction and transfer bridges connecting two adjacent first electrode blocks; and
the gap cuts off part of a first electrode block and extends along a curved or polyline trajectory,
wherein in the one of the touch islands;
the touch electrodes further comprise at least two second touch electrodes, the second touch electrodes extend along the row direction and are arranged at intervals along the column direction, and any of the first touch electrodes intersects with, but is insulated from, each of the second touch electrodes; and
each of the first touch electrodes is a driving electrode for receiving a driving signal, and each of the second touch electrodes is one of the sensing electrodes,
wherein one of the second touch electrodes comprises at least two second electrode blocks connected in series along the row direction;
one of the transfer bridges intersects with one of the second touch electrodes; and
the touch layer comprises:
a transfer layer, provided on a side of the display substrate and comprising the transfer bridges;
an isolation layer covering the transfer layer; and
an electrode layer, provided on a surface of the isolation layer away from the display substrate, and comprising the first electrode block and the second electrode block.

* * * * *